US007952739B2

(12) United States Patent
Matsumoto

(10) Patent No.: US 7,952,739 B2
(45) Date of Patent: May 31, 2011

(54) IMAGE FORMING APPARATUS, IMAGE PROCESSING APPARATUS, IMAGE FORMING METHOD, IMAGE PROCESSING METHOD, PROGRAM, AND STORAGE MEDIUM

(75) Inventor: Hirotsugu Matsumoto, Tokyo (JP)

(73) Assignee: Canon Kabushiki Kaisha (JP)

( * ) Notice: Subject to any disclaimer, the term of this patent is extended or adjusted under 35 U.S.C. 154(b) by 247 days.

(21) Appl. No.: 11/689,040

(22) Filed: Mar. 21, 2007

(65) Prior Publication Data

US 2007/0223034 A1    Sep. 27, 2007

(30) Foreign Application Priority Data

Mar. 23, 2006  (JP) ................................. 2006-081489

(51) Int. Cl.
G06F 3/12          (2006.01)
(52) U.S. Cl. ........ 358/1.15; 358/1.13; 707/638; 707/695
(58) Field of Classification Search .................... 707/10, 707/104.1, 203
See application file for complete search history.

(56) References Cited

U.S. PATENT DOCUMENTS

| | | | | |
|---|---|---|---|---|
| 6,035,297 | A  * | 3/2000 | Van Huben et al. | 707/695 |
| 6,078,934 | A  * | 6/2000 | Lahey et al. | 715/205 |
| 6,651,069 | B2 * | 11/2003 | Aoyama et al. | 707/695 |
| 7,716,182 | B2 * | 5/2010 | Tewksbary | 707/638 |
| 7,797,277 | B2 * | 9/2010 | Suzuki | 707/638 |
| 2002/0080387 | A1 * | 6/2002 | Grasso et al. | 358/1.15 |
| 2002/0114002 | A1 * | 8/2002 | Mitsubori et al. | 358/1.15 |
| 2002/0184048 | A1 * | 12/2002 | Gelhaus et al. | 705/1 |
| 2004/0027604 | A1 * | 2/2004 | Jeran et al. | 358/1.14 |
| 2004/0194026 | A1 * | 9/2004 | Barrus et al. | 715/515 |
| 2005/0097441 | A1 * | 5/2005 | Herbach et al. | 715/501.1 |
| 2005/0219609 | A1 * | 10/2005 | Czyszczewski et al. | 358/1.15 |
| 2006/0150079 | A1 * | 7/2006 | Albornoz et al. | 715/512 |
| 2006/0285168 | A1 * | 12/2006 | Horino et al. | 358/3.28 |
| 2009/0231609 | A1 * | 9/2009 | Chipchase et al. | 358/1.15 |

FOREIGN PATENT DOCUMENTS

| | | |
|---|---|---|
| JP | 10-021416 A | 1/1998 |
| JP | 10-308868 A | 11/1998 |
| JP | 2002-197101 A | 7/2002 |
| JP | 2004304587 A  * | 10/2004 |

OTHER PUBLICATIONS

Notification of the Second Office Action issued in corresponding Chinese Patent Application No. 200710091801.3 dated Dec. 29, 2010. Full English abstract provided.

* cited by examiner

*Primary Examiner* — Neveen Abel-Jalil
*Assistant Examiner* — Daniel Kinsaul
(74) *Attorney, Agent, or Firm* — Rossi, Kimms & McDowell LLP

(57) ABSTRACT

Version information set at a client terminal apparatus (110) is received. Identification data and print data generated at the client terminal apparatus (110) based on a file set at the client terminal apparatus (110) are received. Identification data of the file of the version indicated by the version information received from the client terminal apparatus (110) is acquired from a document management server (120). If the acquired identification data matches the received identification data, a print process is executed by using the received print data. Otherwise, a file corresponding to the acquired identification data is acquired from the document management server (120), and a print process is executed by using print data based on the acquired file.

6 Claims, 17 Drawing Sheets

FIG. 6

| 601 | 602 | 603 | 604 | 605 | 606 | 607 | 608 |
|---|---|---|---|---|---|---|---|
| USER ID | PASSWORD | DOCUMENT MANAGEMENT SERVER ID | DOCUMENT ID | ID OF LATEST VERSION | ID OF ORIGINAL | ASSOCIATED DOCUMENT INFORMATION | PRINT DATA |
| 10001 | PASSWORD 1 | Server 1 | 19211 | 19211 | 8032 | TREE INFORMATION 1 | PRINT DATA 1 |
| 1003 | PASSWORD 2 | Server 2 | 20030 | 20389 | 9002 | TREE INFORMATION 2 | PRINT DATA 2 |
| ...... | ...... | ...... | ...... | ...... | ...... | ...... | ...... |
| 3002 | PASSWORD N | Server 1 | 23413 | 23413 | 23413 | TREE INFORMATION N | PRINT DATA 3 |

IMAGE FORMING APPARATUS, IMAGE PROCESSING APPARATUS, IMAGE FORMING METHOD, IMAGE PROCESSING METHOD, PROGRAM, AND STORAGE MEDIUM

BACKGROUND OF THE INVENTION

1. Field of the Invention

The present invention relates to image forming apparatus, image processing apparatus, image forming method, image processing method, program, and storage medium, particularly to a file processing technique.

2. Description of the Related Art

There conventionally exist systems that manage documents by using a document ID embedded in each document image to identify the document. For example, a document ID embedded in a document image is recognized and transmitted to the server. If a version newer than the read document image is present, the user can acquire and print the data of the new version (Japanese Patent Laid-Open No. 2002-197101).

A multifunctional peripheral having a document management function can recognize a document ID on a read document, read out corresponding data, and print or transmit it. Upon receiving image data with a document ID mark transmitted by facsimile from a facsimile apparatus in a remote place, the multifunctional peripheral (document management apparatus) can return corresponding data to the facsimile apparatus in the remote place based on the document ID (Japanese Patent Laid-Open No. 10-308868).

In these conventional techniques, document management is done by using document IDs embedded in document images. To obtain data of a different version of an image on a document, it is necessary to recognize the document ID on the document by reading the image on the document.

In outputting electronic data saved in, e.g., a PC, the user sometimes wants to acquire and output associated data (data of a different version). In the prior arts, it is necessary to recognize the document ID by reading a printed product obtained by printing the electronic data temporarily saved in the PC, resulting in cumbersome operation.

SUMMARY OF THE INVENTION

The present invention has been made in consideration of the above-described problems, and has as its object to provide a technique of processing an arbitrary version of a file acquired from an apparatus that holds a file group based on electronic data received from an external device.

In order to achieve the object of the present invention, for example, an image forming apparatus of the present invention has the following arrangement.

An image forming apparatus which executes data communication between a client terminal apparatus and a document management server that holds, as file update history information, files of updated versions and identification data to identify the files of updated versions, comprises:

a first reception unit adapted to receive, from the client terminal apparatus, version information set at the client terminal apparatus as a version of a file to be printed by the image forming apparatus;

a second reception unit adapted to receive, from the client terminal apparatus, print data generated at the client terminal apparatus based on a file set at the client terminal apparatus as a candidate to be printed by the image forming apparatus and identification data of the file;

an acquisition unit adapted to acquire, from the document management server, identification data of the file of the version indicated by the version information received by the first reception unit; and a print unit adapted to execute a print process by using the print data received by the second reception unit if the identification data acquired by the acquisition unit matches the identification data received by the second reception unit, and otherwise, acquire a file corresponding to the identification data acquired by the acquisition unit from the document management server and execute a print process by using print data based on the acquired file.

In order to achieve the object of the present invention, for example, an image forming apparatus of the present invention has the following arrangement.

An image forming apparatus which executes data communication between an external device having an image forming function and a document management server that holds, as file update history information, files of updated versions and identification data to identify the files of updated versions, comprises:

a first reception unit adapted to receive, from the external device, version information set at the external device as a version of a file to be printed by the image forming apparatus;

a second reception unit adapted to receive, from the external device, print data generated at the external device based on a file set at the external device as a candidate to be printed by the image forming apparatus and identification data of the file;

an acquisition unit adapted to acquire, from the document management server, identification data of the file of the version indicated by the version information received by the first reception unit; and a reply unit adapted to reply the print data received by the second reception unit to the external device if the identification data acquired by the acquisition unit matches the identification data received by the second reception unit, and otherwise, acquire a file corresponding to the identification data acquired by the acquisition unit from the document management server and reply print data based on the acquired file to the external device.

In order to achieve the object of the present invention, for example, an image processing apparatus of the present invention has the following arrangement.

An image processing apparatus which executes data communication between a client terminal apparatus and a document management server that holds, as file update history information, files of updated versions and identification data to identify the files of updated versions, comprises:

a first reception unit adapted to receive, from the client terminal apparatus, version information set at the client terminal apparatus as a version of a file to be output from the image processing apparatus;

a second reception unit adapted to receive, from the client terminal apparatus, output data generated at the client terminal apparatus based on a file set at the client terminal apparatus as a candidate to be output from the image processing apparatus and identification data of the file;

an acquisition unit adapted to acquire, from the document management server, identification data of the file of the version indicated by the version information received by the first reception unit; and an output unit adapted to execute an output process by using the output data received by the second reception unit if the identification data acquired by the acquisition unit matches the identification data received by the second reception unit, and otherwise, acquire a file corresponding to the identification data acquired by the acquisition unit from the document management server and execute an output process by using output data based on the acquired file.

In order to achieve the object of the present invention, for example, an image forming method performed by an image forming apparatus of the present invention has the following steps.

An image forming method performed by an image forming apparatus which executes data communication between a client terminal apparatus and a document management server that holds, as file update history information, files of updated versions and identification data to identify the files of updated versions, comprises:

a first reception step of receiving, from the client terminal apparatus, version information set at the client terminal apparatus as a version of a file to be printed in the image forming apparatus;

a second reception step of receiving, from the client terminal apparatus, print data generated at the client terminal apparatus based on a file set at the client terminal apparatus as a candidate to be printed in the image forming apparatus and identification data of the file;

an acquisition step of acquiring, from the document management server, identification data of the file of the version indicated in the version information received in the first reception step; and a print step of executing a print process by using the print data received in the second reception step if the identification data acquired in the acquisition step matches the identification data received in the second reception step, and otherwise, acquiring a file corresponding to the identification data acquired in the acquisition step from the document management server and executing a print process by using print data based on the acquired file.

In order to achieve the object of the present invention, for example, an image forming method performed by an image forming apparatus of the present invention has the following steps.

An image forming method performed by an image forming apparatus which executes data communication between an external device having an image forming function and a document management server that holds, as file update history information, files of updated versions and identification data to identify the files of updated versions, comprises:

a first reception step of receiving, from the external device, version information set at the external device as a version of a file to be printed in the image forming apparatus;

a second reception step of receiving, from the external device, print data generated at the external device based on a file set at the external device as a candidate to be printed in the image forming apparatus and identification data of the file;

an acquisition step of acquiring, from the document management server, identification data of the file of the version indicated in the version information received in the first reception step; and a reply step of replying the print data received in the second reception step to the external device if the identification data acquired in the acquisition step matches the identification data received in the second reception step, and otherwise, acquiring a file corresponding to the identification data acquired in the acquisition step from the document management server and replying print data based on the acquired file to the external device.

In order to achieve the object of the present invention, for example, an image processing method performed by an image processing apparatus of the present invention has the following steps.

An image processing method performed by an image processing apparatus which executes data communication between a client terminal apparatus and a document management server that holds, as file update history information, files of updated versions and identification data to identify the files of updated versions, comprises:

a first reception step of receiving, from the client terminal apparatus, version information set at the client terminal apparatus as a version of a file to be output from the image processing apparatus;

a second reception step of receiving, from the client terminal apparatus, output data generated at the client terminal apparatus based on a file set at the client terminal apparatus as a candidate to be output from the image processing apparatus and identification data of the file;

an acquisition step of acquiring, from the document management server, identification data of the file of the version indicated in the version information received in the first reception step; and an output step of executing an output process by using the output data received in the second reception step if the identification data acquired in the acquisition step matches the identification data received in the second reception step, and otherwise, acquiring a file corresponding to the identification data acquired in the acquisition step from the document management server and executing an output process by using output data based on the acquired file.

Further features of the present invention will become apparent from the following description of exemplary embodiments (with reference to the attached drawings).

BRIEF DESCRIPTION OF THE DRAWINGS

FIG. 6 is a view showing a structural example of a table (associated document management table) to manage history information;

DESCRIPTION OF THE EMBODIMENTS

The preferred embodiments of the present invention will be described below in detail with reference to the accompanying drawings.

First Embodiment

Figure 1:
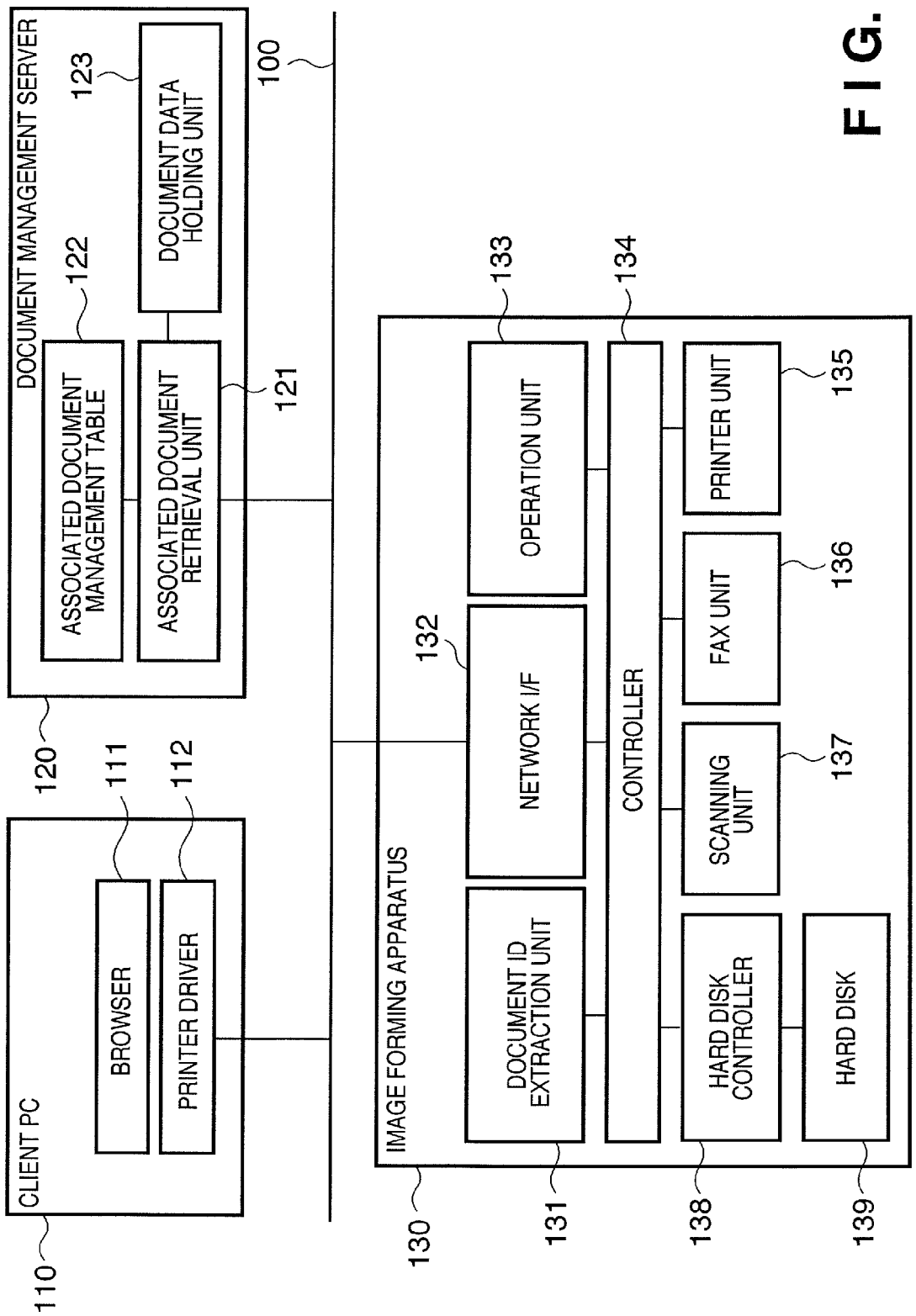
FIG. 1 is a block diagram showing a configuration example of a system according to the first embodiment of the present invention.

FIG. 1 is a block diagram showing a configuration example of a system according to this embodiment. As shown in FIG. 1, the system according to this embodiment comprises a client terminal apparatus (client PC) 110, document management server 120, and image forming apparatus 130. They connect to a LAN 100 to communicate data.

The first embodiment will be described below using the system having the configuration shown in FIG. 1. The number of the client terminal apparatuses 110, the number of document management servers 120, the number of image forming apparatuses 130, and the network configuration are not limited to those shown in FIG. 1. That is, the number of apparatuses of each type and the network configuration can be changed variously. However, the essence of the technique to be described below does not change regardless of the modifications. Those skilled in the art can cope with any modification by changing the technique as needed.

The client terminal apparatus 110 will be described first. The client terminal apparatus 110 comprises a browser 111 and a printer driver 112.

The browser 111 can access the image forming apparatus 130 via the LAN 100 and perform various kinds of operations to be described later. The printer driver 112 compatible with the image forming apparatus 130 sends corresponding data to it.

The document management server 120 will be described next. The document management server 120 comprises an associated document management table 122, associated document retrieval unit 121, and document data holding unit 123.

The associated document management table 122 holds various kinds of information to be described later. Details will be described later. The document data holding unit 123 holds, as document file update history information, document files of updated versions and identification data to identify the document files of updated versions. Various data are applicable as the identification data. For example, each document file may contain a two-dimensional bar code (e.g., QP code) to identify the document file. Identification data may be embedded in a document file as a digital watermark. The identification data will be referred to as a "document ID" hereinafter. The associated document retrieval unit 121 retrieves information requested from an external device from the pieces of information registered in the document data holding unit 123.

The image forming apparatus 130 will be described next. The image forming apparatus 130 comprises a document ID extraction unit 131, network I/F 132, operation unit 133, controller 134, hard disk controller 138, hard disk 139, scanning unit 137, FAX unit 136, and printer unit 135.

The document ID extraction unit 131 extracts a document ID contained in a document file received from the client terminal apparatus 110 or the file of an image read by the scanning unit 137. As described above, various methods are available to embed a document ID in a document file. The document ID extraction unit 131 extracts a document ID by a method corresponding to the embedding method.

The network I/F 132 functions as an I/F for data communication with the remaining apparatuses connected to the LAN 100. The operation unit 133 includes a touch-panel display screen and buttons. The operation unit 133 displays various kinds of operation windows and receives various kinds of operation instructions.

The hard disk controller 138 controls access to the hard disk 139. The hard disk 139 saves the OS (Operating System) and programs and data related to the operation of the image forming apparatus 130.

The scanning unit 137 is, e.g., a scanner which reads information printed on a printing medium such as a paper sheet as an image. The hard disk controller 138 saves the read image data in the hard disk 139. The FAX unit 136 executes a communication process with an external device via a FAX line. The printer unit 135 prints an image or text on a printing medium such as a paper sheet based on print data.

The controller 134 controls the operations of the units included in the image forming apparatus 130.

The LAN 100 is an example of a network. Any other network such as the Internet may be used. The network can be either wireless or wired.

Figure 13:
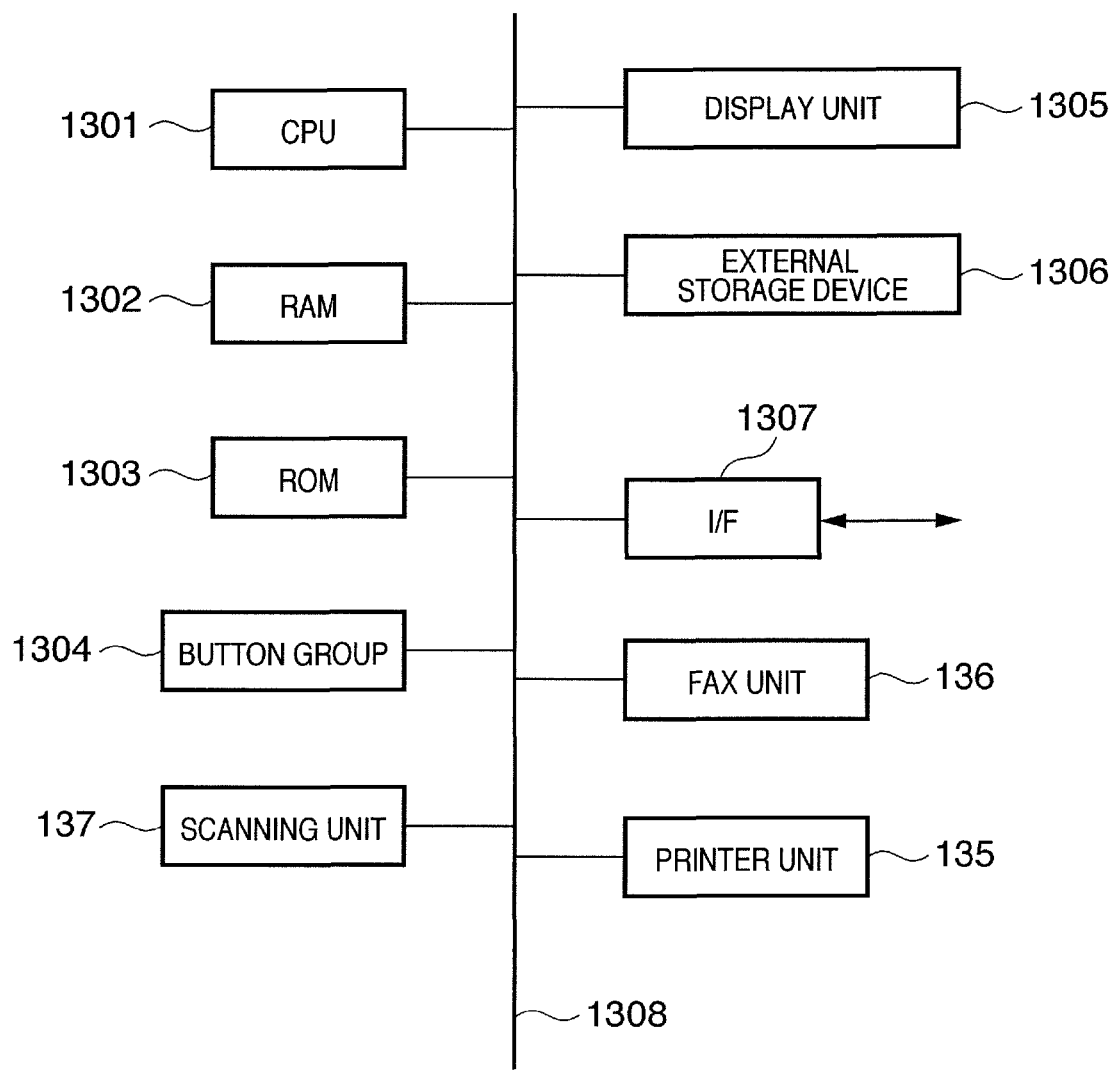
FIG. 13 is a block diagram showing the hardware configuration of the image forming apparatus 130.

FIG. 13 is a block diagram showing the hardware configuration of the image forming apparatus 130. The same reference numerals as in FIG. 1 denote the same parts in FIG. 13, and a description thereof will be omitted.

A CPU 1301 controls the overall image forming apparatus 130 by using programs and data stored in a RAM 1302 and a ROM 1303. The CPU 1301 also executes or controls each process (to be described later) executed by the image forming apparatus 130.

The RAM 1302 has an area to temporarily store programs and data loaded from an external storage device 1306 or the ROM 1303, data of an image read by the scanning unit 137, or data received from an external device via an I/F 1307. The RAM 1302 also has a work area used by the CPU 1301 to execute various kinds of processes. That is, the RAM 1302 can provide various kinds of areas as needed.

A button group 1304 is included in the operation unit 133. That is, the button group 1304 includes physical buttons. The operator of the image forming apparatus 130 can input various kinds of instructions by operating the buttons.

A display unit 1305 is included in the operation unit 133. More specifically, the display unit 1305 is a touch-panel liquid crystal display panel which displays various kinds of operation windows and allows the user to input various kinds of instructions.

The external storage device 1306 expresses the hard disk controller 138 and hard disk 139 together. The external storage device 1306 saves the OS, and programs and data to make the CPU 1301 execute each process (to be described later) executed by the image forming apparatus 130. The programs and data are loaded to the RAM 1302, as needed, under the control of the CPU 1301.

The I/F 1307 corresponds to the network I/F 132.

A bus 1308 connects the above-described units.

Figure 14:
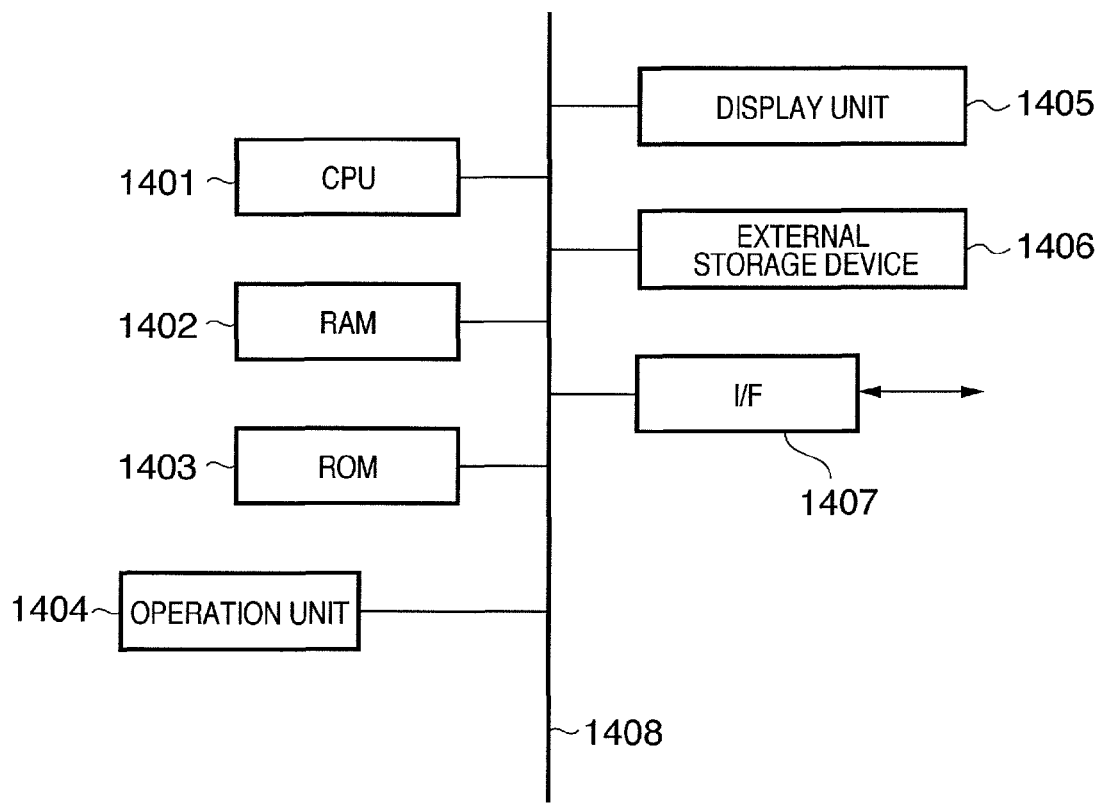
FIG. 14 is a block diagram showing the hardware configuration of a computer applicable to the client terminal apparatus 110 and document management server 120.

FIG. 14 is a block diagram showing the hardware configuration of a computer applicable to the client terminal apparatus 110 and document management server 120.

A CPU 1401 controls the overall apparatus using the computer by using programs and data stored in a RAM 1402 and a ROM 1403. The CPU 1401 also executes each process (to be described later) executed by the apparatus using the computer.

The RAM 1402 has an area to temporarily store programs and data loaded from an external storage device 1406 or the ROM 1403, or data received from an external device via an I/F 1407. The RAM 1402 also has a work area used by the CPU 1401 to execute various kinds of processes. That is, the RAM 1402 can provide various kinds of areas as needed.

The ROM 1403 stores boot programs and setting data of the apparatus using the computer.

The operator of the computer can input various kinds of instructions to the CPU 1401 by operating an operation unit 1404.

A display unit 1405 includes a CRT or a liquid crystal display panel which can display a process result of the CPU 1401 as an image or text.

The external storage device 1406 saves the OS, and programs and data to make the CPU 1401 execute each process (to be described later) executed by the apparatus using the computer. The programs and data are loaded to the RAM 1402, as needed, under the control of the CPU 1401. For example, when the computer is applied to the client terminal apparatus 110, the external storage device 1406 saves programs and data related to the browser 111 and programs and data related to the printer driver 112. When the computer is applied to the document management server 120, the external storage device 1406 saves the associated document management table 122, data held by the document data holding unit 123, and programs and data related to the associated document retrieval unit 121.

The I/F 1407 connects the apparatus using the computer to the LAN 100.

A bus 1408 connects the above-described units.

Figure 3:
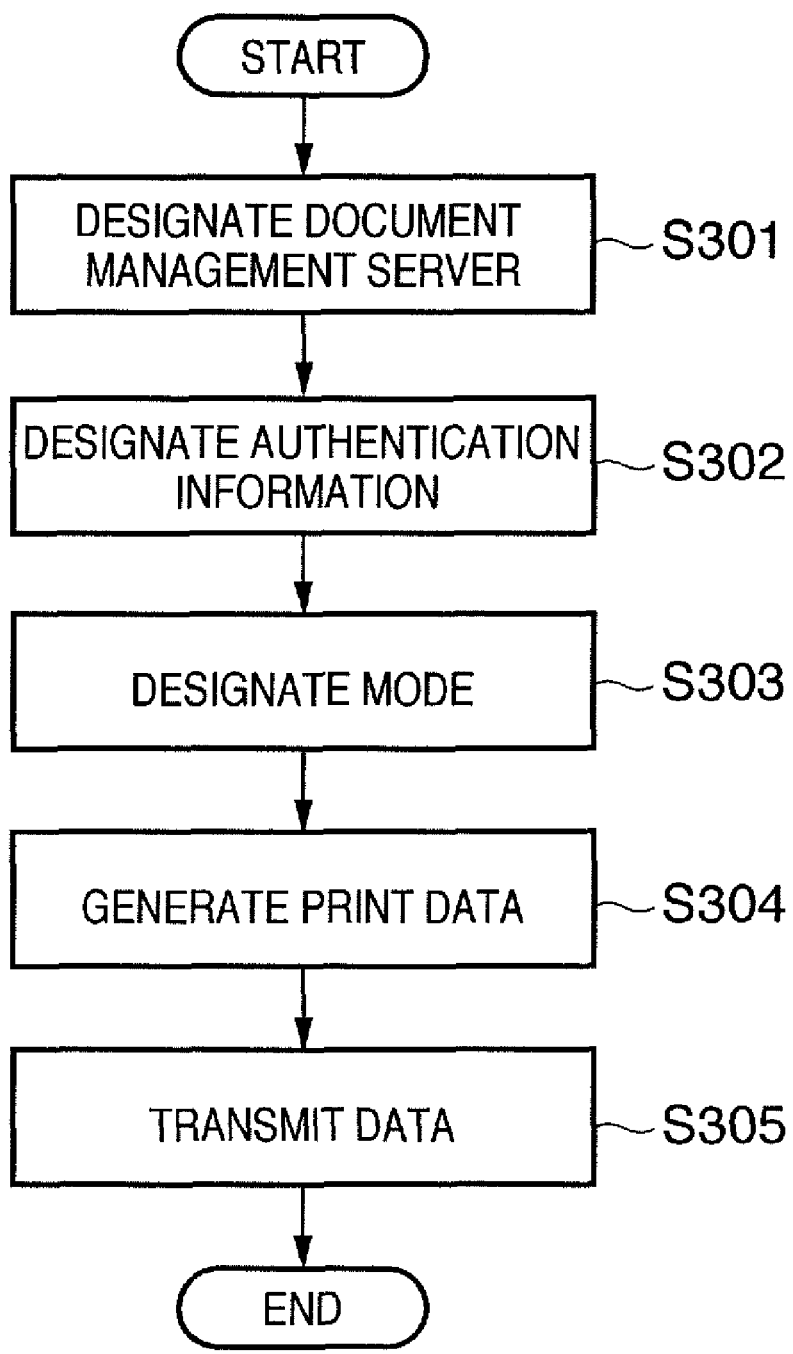
FIG. 3 is a flowchart of a process that is executed by a client terminal apparatus 110 to transmit a document file held at the client terminal apparatus 110 to an image forming apparatus 130 and process the document file.

A process that is executed by the client terminal apparatus 110 to transmit a document file held at the client terminal apparatus 110 to the image forming apparatus 130 and process the document file will be described next with reference to FIG. 3 showing the flowchart of the process. The external storage device 1406 saves programs and data to make the CPU 1401 execute the process according to the flowchart in FIG. 3. The programs and data are loaded to the RAM 1402, as needed, under the control of the CPU 1401. When the CPU 1401 executes the process by using the loaded programs and data, the client terminal apparatus 110 executes the process to be described below.

The operator of the client terminal apparatus 110 selects, by using the operation unit 1404, a document file to be transmitted to the image forming apparatus 130. With this selection, the CPU 1401 loads the document file of the transmission target from the external storage device 1406 to the RAM 1402. As described above, the document file has a document ID to identify the document file in the form of, e.g., a QP code.

Figure 2:
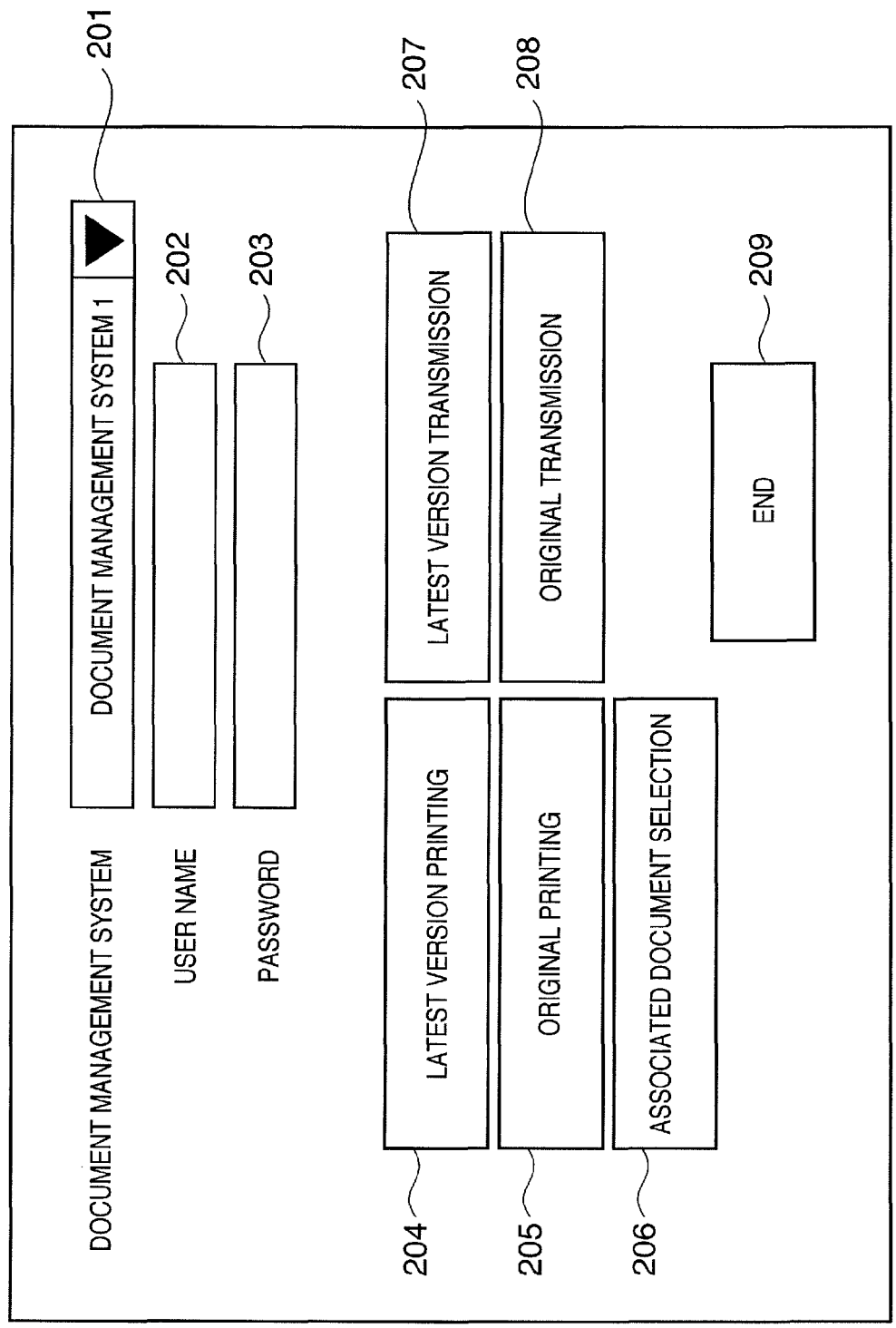
FIG. 2 is a view showing a display example of a GUI (Graphical User Interface) to do settings related to transmission of a document file.

When the operator inputs, by using the operation unit 1404, an instruction to transmit the document file to the image forming apparatus 130, the CPU 1401 detects the input and displays a window shown in FIG. 2 on the display screen of the display unit 1405. FIG. 2 is a view showing a display example of a GUI (Graphical User Interface) to do settings related to transmission of a document file.

Reference numeral 201 denotes a menu tab to display a list of device names of document management servers currently connected to the client terminal apparatus 110. The list can be displayed by designating the tab 201 by using the operation unit 1404. It is possible to select a document management server as the access target of the image forming apparatus 130 from the device names displayed in the list.

A field 202 is used to input a user name. The operator inputs, to the field 202, a user name to be input to log in to the document management server selected by using the tab 201. A field 203 is used to input a password. The operator inputs, to the field 203, a password to be input to log in to the document management server selected by using the tab 201.

A button image 204 is used to select a mode (latest version print mode) to cause the image forming apparatus 130 to print the latest version of the document file (actually, the print data of the document file) to be transmitted to the image forming apparatus 130. The operator can set the latest version print mode by designating the button image.

A button image 205 is used to select a mode (original print mode) to cause the image forming apparatus 130 to print the original (earliest version) of the document file (actually, the print data of the document file) to be transmitted to the image forming apparatus 130. The operator can set the original print mode by designating the button image.

A button image 207 is used to select a mode (latest version transmission mode) to cause the image forming apparatus 130 to externally transmit the latest version of the document file (actually, the print data of the document file) to be transmitted to the image forming apparatus 130. The operator can set the latest version transmission mode by designating the button image.

A button image 208 is used to select a mode (original transmission mode) to cause the image forming apparatus 130 to externally transmit the original (earliest version) of the document file to be transmitted to the image forming apparatus 130. The operator can set the original transmission mode by designating the button image. The document file to be transmitted to the image forming apparatus 130 is actually the print data of the document file.

When the operator designates the button image 207 or 208, the display unit 1405 newly displays, on its display screen, a GUI (not shown) to set the transmission destination and transmission method (e.g., FAX, SMB, and FTP). The operator sets the transmission destination and transmission method in this window.

A button image 206 will be described later in detail. The operator can set an associated document selection mode by designating the button image 206.

By using the above-described GUI, the operator can set the version (latest version or earliest version) of the document file and the process to be executed by the image forming apparatus 130. The operator can also set authentication information (user name and password) and the document management server as the access target of the image forming apparatus 130.

In step S301, the client terminal apparatus 110 sets the document management server selected by the tab 201 as the access target of the image forming apparatus 130. In step S302, the client terminal apparatus 110 sets the user name and password input to the fields 202 and 203 as authentication information. In step S303, the client terminal apparatus 110 sets a mode corresponding to a selected one of the button images 204 to 208. When the operator designates the button image 207 or 208, the display unit 1405 newly displays, on its display screen, a GUI to set the transmission destination and transmission method, as described above. The client terminal apparatus 110 sets the transmission destination and transmission method designated in this window.

When the operator designates a button image 209 after making these settings, the client terminal apparatus 110 generates the print data of the document file to be transmitted to the image forming apparatus 130 in step S304. As described above, the document file contains its document ID. The print data of the document file contains the document ID as a matter of course. In step S305, the client terminal apparatus 110 transmits, to the image forming apparatus 130, the generated print data containing the setting contents set by using the GUI in FIG. 2 (including the transmission destination and transmission method if a transmission mode is set). The print data transmitted can have any data format such as FAX data, PDL, or image data if the image forming apparatus can interpret it.

Figure 4A:
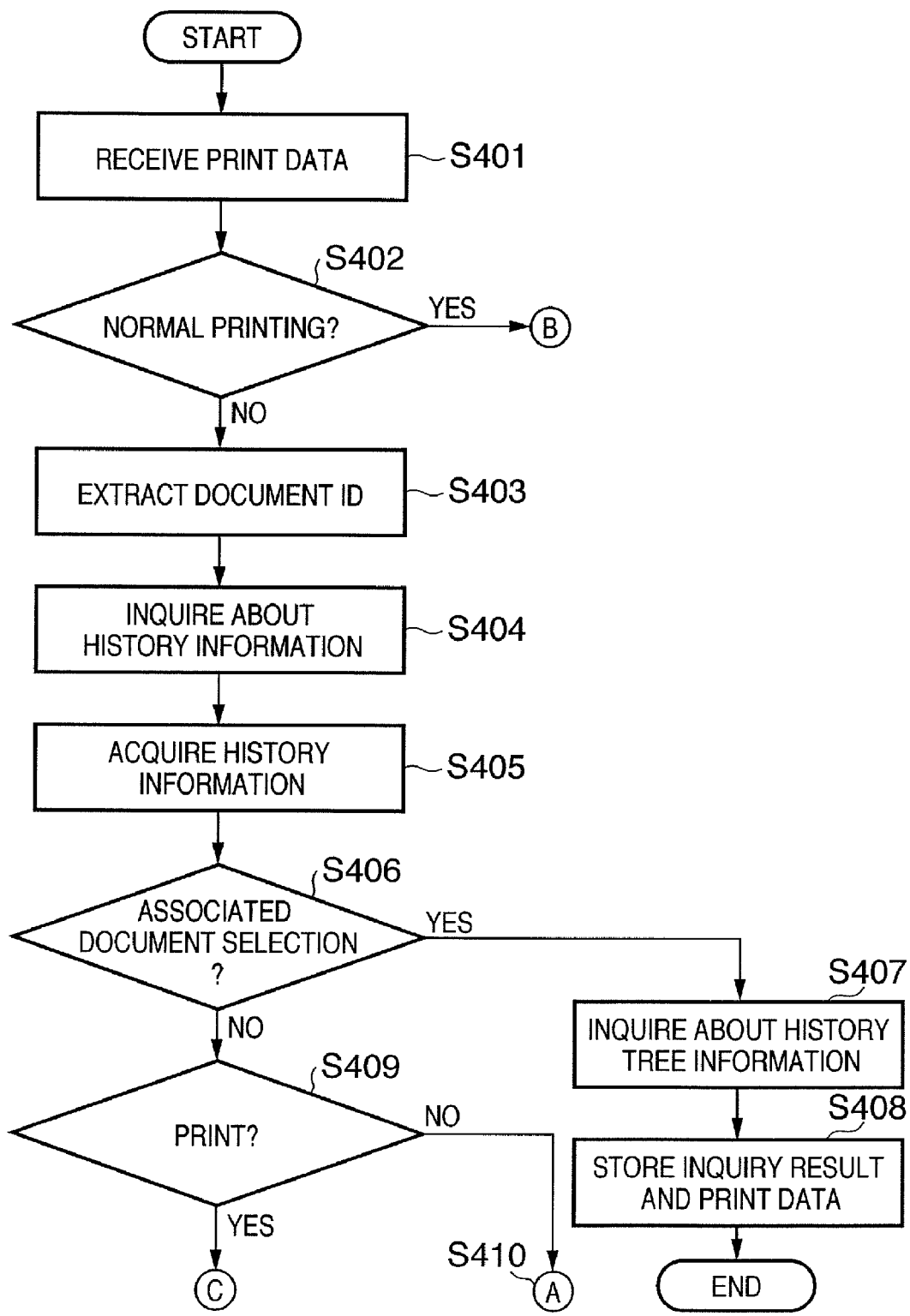
FIGS. 4A and 4B are flowchart of a process that is executed by an image forming apparatus 130 upon receiving transmitted print data.
Figure 4B:
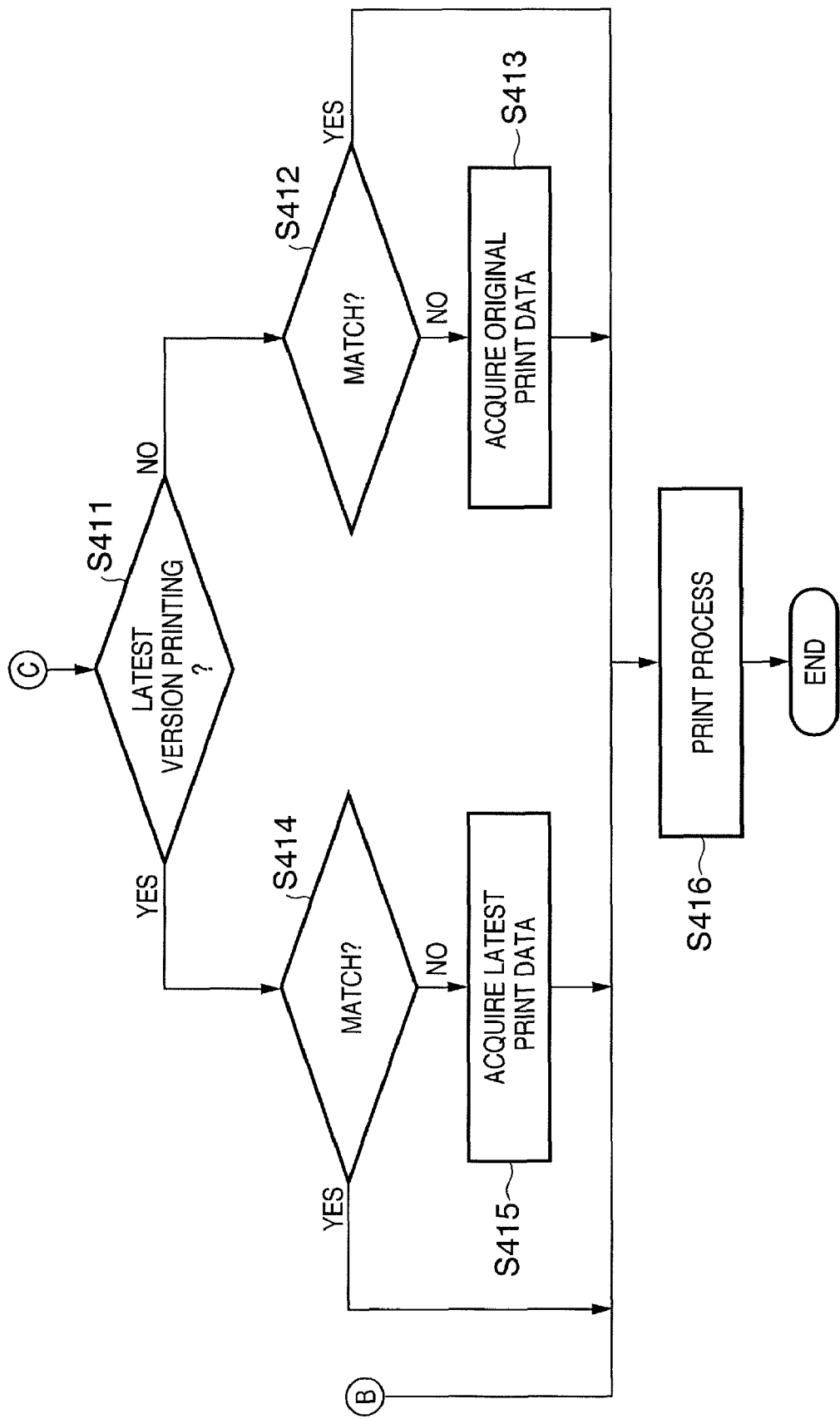

A process that is executed by the image forming apparatus 130 upon receiving various kinds of data transmitted by the above-described process will be described next with reference to FIGS. 4A and 4B showing the flowchart of the process. The ROM 1303 or external storage device 1306 saves programs and data to make the CPU 1301 execute the process according to the flowchart in FIGS. 4A and 4B. The programs and data are loaded to the RAM 1302, as needed, under the control of the CPU 1301. When the CPU 1301 executes the process by using the loaded programs and data, the image forming apparatus 130 executes the process to be described below.

In step S401, the image forming apparatus 130 temporarily saves, in the RAM 1302 or external storage device 1306, the print data generated and transmitted from the client terminal apparatus 110 in accordance with the flowchart in FIG. 3. In step S402, the image forming apparatus 130 confirms the print mode based on the received print data. To do this, the mode contained in the print data is referred to. If the normal print mode is set, the process advances from step S402 to step S416 to send the print data to the printer unit 135. The printer unit 135 starts a print operation based on the print data. For normal printing, the client terminal apparatus 110 does not display the window shown in FIG. 2. The user inputs a print instruction by using a GUI (not shown) displayed by the normal printer driver.

If the mode referred to in the print data does not indicate normal printing, the process advances from step S402 to step S403. In this embodiment, the user sets a mode by designating one of the button images 204 to 208 on the GUI shown in FIG. 2. Hence, the normal print mode is not set.

In step S403, the image forming apparatus 130 extracts the document ID contained in the print data. The print data received in step S401 contains setting contents set by using the GUI in FIG. 2, as described above. Hence, the print data contains information about the apparatus (document management server 120 in this embodiment) selected by the tab 201, as a matter of course. In step S404, the image forming apparatus 130 first accesses the document management server 120 by referring to this information. Then, the image forming apparatus 130 requests the document management server 120 to acquire the document ID of the document file of latest version and the document ID of the document file of earliest version from document IDs in the history information containing the extracted document ID.

As described above, the document management server 120 holds, as document file update history information, document files of updated versions and the document IDs of the document files of updated versions. When a document ID is received from the image forming apparatus 130, and the history information contains the document ID, the document management server 120 replies the document ID of the document file of latest version and the document ID of the document file of earliest version in the history information to the image forming apparatus 130.

In this way, the image forming apparatus 130 can acquire, from the document management server 120, the document ID of latest version and that of earliest version of the file received from the client terminal apparatus 110 as a process target file.

In step S405, the image forming apparatus 130 receives the requested document IDs (the document ID of latest version and that of earliest version) transmitted from the document management server 120 and saves them in the RAM 1302.

In step S406, the image forming apparatus 130 checks whether the mode referred to in step S402 is the associated document selection mode (i.e., whether the operator has designated the button image 206 in FIG. 6). If it is determined by this check that the associated document selection mode is set, the process advances from step S406 to step S407. In step S407, the image forming apparatus 130 requests history information (tree information) corresponding to the document ID extracted in step S403 of the document management server 120. In step S408, the image forming apparatus 130 receives tree information transmitted from the document management server 120 in response to the request and registers various kinds of information including the received tree information in a table shown in FIG. 6.

FIG. 6 is a view showing a structural example of a table (associated document management table) to manage history information. Upon receiving print data from the client terminal apparatus 110, the image forming apparatus 130 registers the user name and password contained in print data in a user name column 601 and a password column 602, respectively. The device name selected by the tab 201 in FIG. 2 is registered in a column 603. The information registered in the column 603 need not always be a device name. Any other information capable of uniquely specifying a device is usable.

The document ID extracted in step S403 is registered in a column 604. The document ID of the latest version and that of the earliest version acquired in step S405 are registered in columns 605 and 606, respectively. The image forming apparatus 130 registers, in a column 607, the tree information (associated document information) replied from the document management server 120. For the associated documents, associated attributes may be set. Alternatively, the state of every change in a single document may be acquired based on its change history. The print data received in step S401 is registered in a column 608.

The above-described table is saved in, e.g., the external storage device 1306.

Referring back to FIG. 4A, if the associated document selection mode is not selected, the process advances for step S406 to step S409. In step S409, the image forming apparatus 130 checks whether the mode set in the print data is a print mode. In this embodiment, the print mode includes the latest version print mode and the original print mode. If it is determined by this check process that the latest version print mode or original print mode is set, the process advances from step S409 to step S411. If the mode set in the print data is not the print mode, i.e., if the latest version transmission mode or original transmission mode is set, the process advances from step S409 to step S410.

In step S411, the image forming apparatus 130 checks which print mode is set in the print data, the latest version print mode or original print mode. If it is determined by this check process that the latest version print mode is set, the process advances from step S411 to step S414. If the original print mode is set, the process advances from step S411 to step S412.

In step S414, the document ID of the latest version received in step S405 is compared with the document ID extracted in step S403. If the document IDs match upon comparison, the process advances to step S416 to send the print data received in step S401 to the printer unit 135. The printer unit 135 starts a print operation based on the print data. On the other hand, if the document IDs do not match, the process advances to step S415. The mismatch indicates that the document file in the print data received in step S401 is not the latest version. Hence, in step S415, the image forming apparatus 130 transmits the document ID of the latest version to the document management server 120 and requests it to acquire the document file of the latest version. The document management server 120 transmits, to the image forming apparatus 130, the document file corresponding to the document ID of the latest version, i.e., the document file of the latest version. In step S415, the image forming apparatus 130 receives the document file. Print data is generated based on the received document file, and the process advances to step S416. In step S416, the print data is sent to the printer unit 135. The printer unit 135 starts a print operation based on the print data.

On the other hand, in step S412, the document ID of the earliest version received in step S405 is compared with the document ID extracted in step S403. If the document IDs match upon comparison, the process advances to step S416 to send the print data received in step S401 to the printer unit 135. The printer unit 135 starts a print operation based on the print data. On the other hand, if the document IDs do not match, the process advances to step S413. The mismatch indicates that the document file in the print data received in step S401 is not the earliest version. Hence, in step S413, the image forming apparatus 130 transmits the document ID of earliest version to the document management server 120 and requests it to acquire the document file of earliest version. The document management server 120 transmits, to the image forming apparatus 130, the document file corresponding to the document ID of earliest version, i.e., the document file of earliest version. In step S413, the image forming apparatus 130 receives the document file. Print data is generated based on the received document file, and the process advances to step S416. In step S416, the print data is sent to the printer unit 135. The printer unit 135 starts a print operation based on the print data.

In this embodiment, the image forming apparatus 130 generates print data in step S415 or S413. Instead, the print data may be generated at the document management server 120 so that the image forming apparatus 130 receives it in step S415 or S413.

Figure 5:
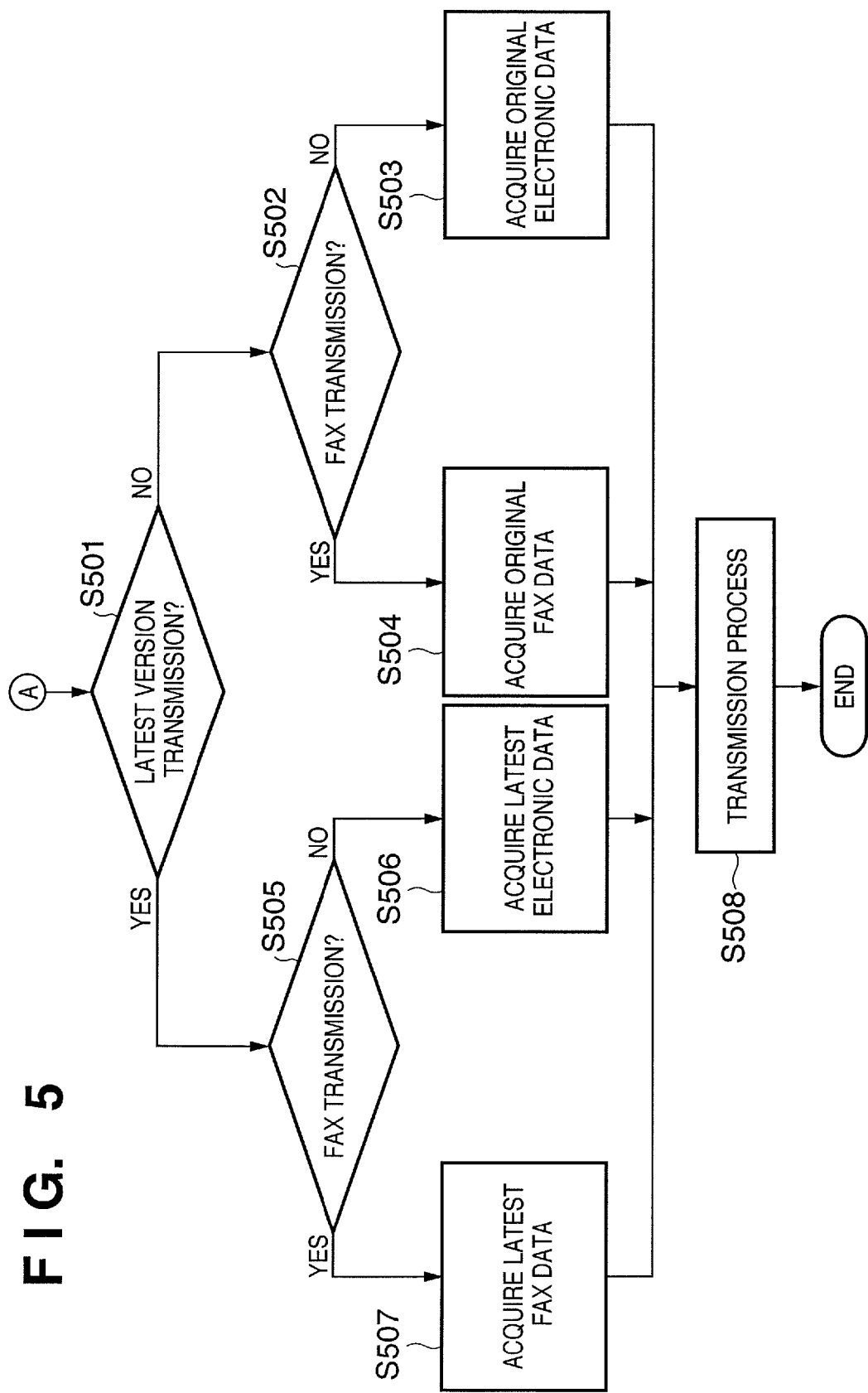
FIG. 5 is a flowchart showing details of the process in step S410.

The process in step S410 will be described next in detail with reference to FIG. 5. FIG. 5 is a flowchart showing details of the process in step S410.

In step S501, the image forming apparatus 130 checks the mode in the print data and determines which mode is set, the latest version transmission mode or original transmission mode. If it is determined by this check process that the latest version transmission mode is set, the process advances from step S501 to step S505. If the original transmission mode is set, the process advances from step S501 to step S502.

In step S505, the image forming apparatus 130 checks by referring to the transmission method in the print data whether FAX transmission is set. If it is determined by this check that FAX transmission is set, the process advances to step S507. In step S507, the image forming apparatus 130 transmits the document ID of the latest version to the document management server 120 and requests it to acquire the document file of the latest version. The document management server 120 transmits, to the image forming apparatus 130, the document file corresponding to the document ID of the latest version, i.e., the document file of latest the version. In step S507, the image forming apparatus 130 receives the document file. FAX data is generated based on the received document file, and the process advances to step S508. In step S508, the FAX data is sent to the FAX unit 136. The FAX unit 136 transmits the FAX data to the transmission destination contained in the print data.

If it is determined by the check process in step S505 that FAX transmission is not set, the process advances to step S506. In step S506, the image forming apparatus 130 transmits the document ID of the latest version to the document management server 120 and requests it to acquire the document file of the latest version. The document management server 120 transmits, to the image forming apparatus 130, the document file corresponding to the document ID of the latest version, i.e., the document file of the latest version. In step S506, the image forming apparatus 130 receives the document file. The process advances to step S508. In step S508, the document file is transmitted (by, e.g., e-mail or SMB) to the transmission destination contained in the print data via the I/F 1307.

In step S502, the image forming apparatus 130 checks by referring to the transmission method in the print data whether FAX transmission is set. If it is determined by this check that FAX transmission is set, the process advances to step S504. In step S504, the image forming apparatus 130 transmits the document ID of the earliest version to the document management server 120 and requests it to acquire the document file of the earliest version. The document management server 120 transmits, to the image forming apparatus 130, the document file corresponding to the document ID of the earliest version, i.e., the document file of the earliest version. In step S504, the image forming apparatus 130 receives the document file. FAX data is generated based on the received document file, and the process advances to step S508. In step S508, the FAX data is sent to the FAX unit 136. The FAX unit 136 transmits the FAX data to the transmission destination contained in the print data.

If it is determined by the check process in step S502 that FAX transmission is not set, the process advances to step S503. In step S503, the image forming apparatus 130 transmits the document ID of the earliest version to the document management server 120 and requests it to acquire the document file of the earliest version. The document management server 120 transmits, to the image forming apparatus 130, the document file corresponding to the document ID of the earliest version, i.e., the document file of the earliest version. In step S503, the image forming apparatus 130 receives the document file. The process advances to step S508. In step S508, the document file is transmitted (by, e.g., e-mail or SMB) to the transmission destination contained in the print data via the I/F 1307.

In this embodiment, the image forming apparatus generates FAX data in step S507 or S504. Instead, the FAX data may be generated at the document management server 120 so that the image forming apparatus 130 receives it in step S507 or S504.

Figure 8:
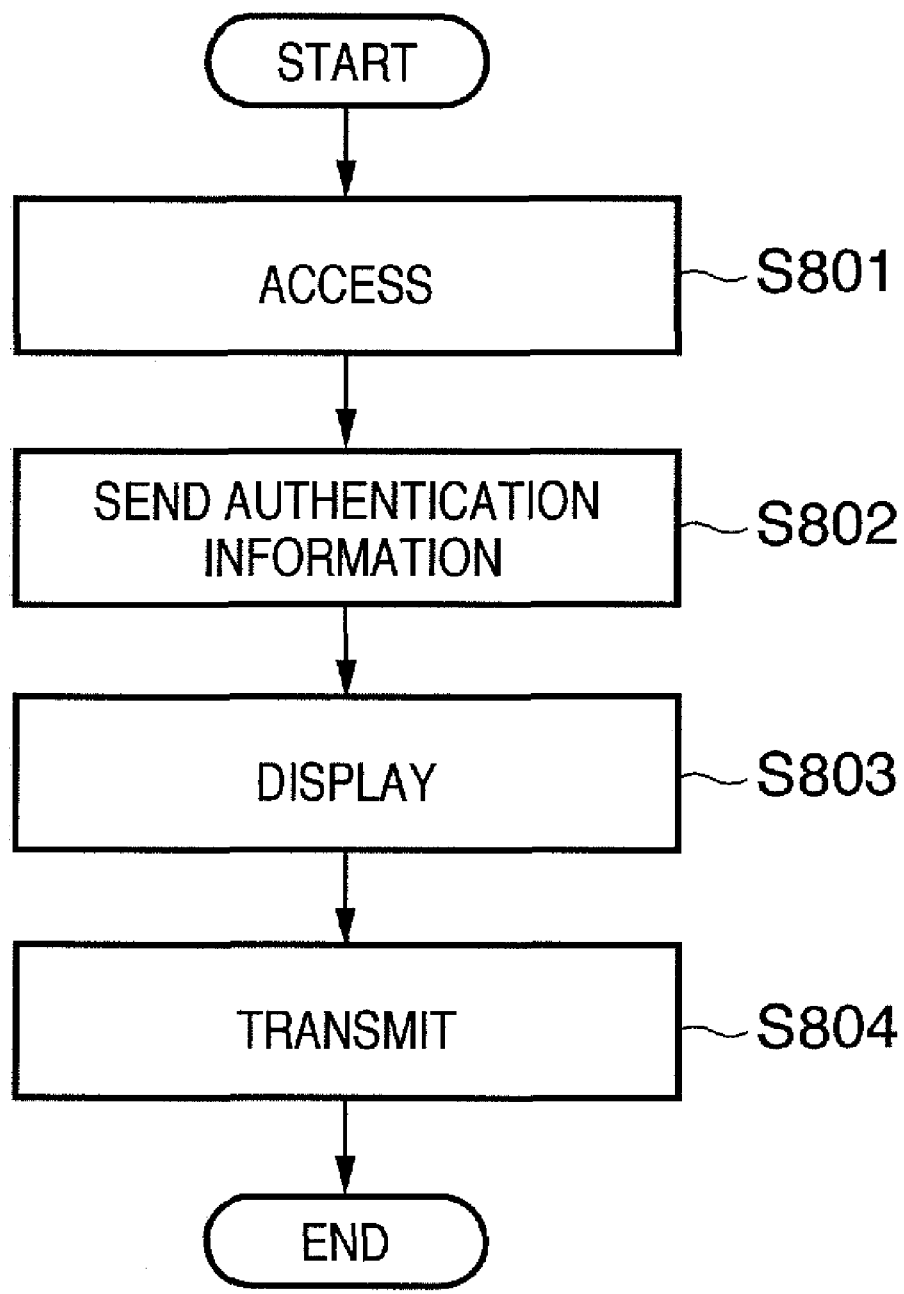
FIG. 8 is a flowchart of a process that is executed by the client terminal apparatus 110 after the user designates a button image 206 on the GUI shown in FIG. 2, and the client terminal apparatus 110 and image forming apparatus 130 then execute the above-described processes.

A process that is executed by the client terminal apparatus 110 after the user designates the button image 206 on the GUI shown in FIG. 2 will be described next with reference to FIG. 8 showing the flowchart of the process. The external storage device 1406 saves programs and data to make the CPU 1401 execute the process according to the flowchart in FIG. 8. The programs and data are loaded to the RAM 1402, as needed, under the control of the CPU 1401. When the CPU 1401 executes the process by using the loaded programs and data, the client terminal apparatus 110 executes the process to be described below.

In step S801, the client terminal apparatus 110 executes the browser 111 that is saved in the external storage device 1406 and loaded to the RAM 1402 and accesses the image forming apparatus 130. The accessed image forming apparatus 130 prompts the user to input authentication information. The user on the side of the client terminal apparatus 110 inputs authentication information such as the user name and password. When the user performs, on the browser 111, an operation of transmitting the input authentication information to the image forming apparatus 130, the authentication information is transmitted to the image forming apparatus 130 in step S802.

Figure 7:
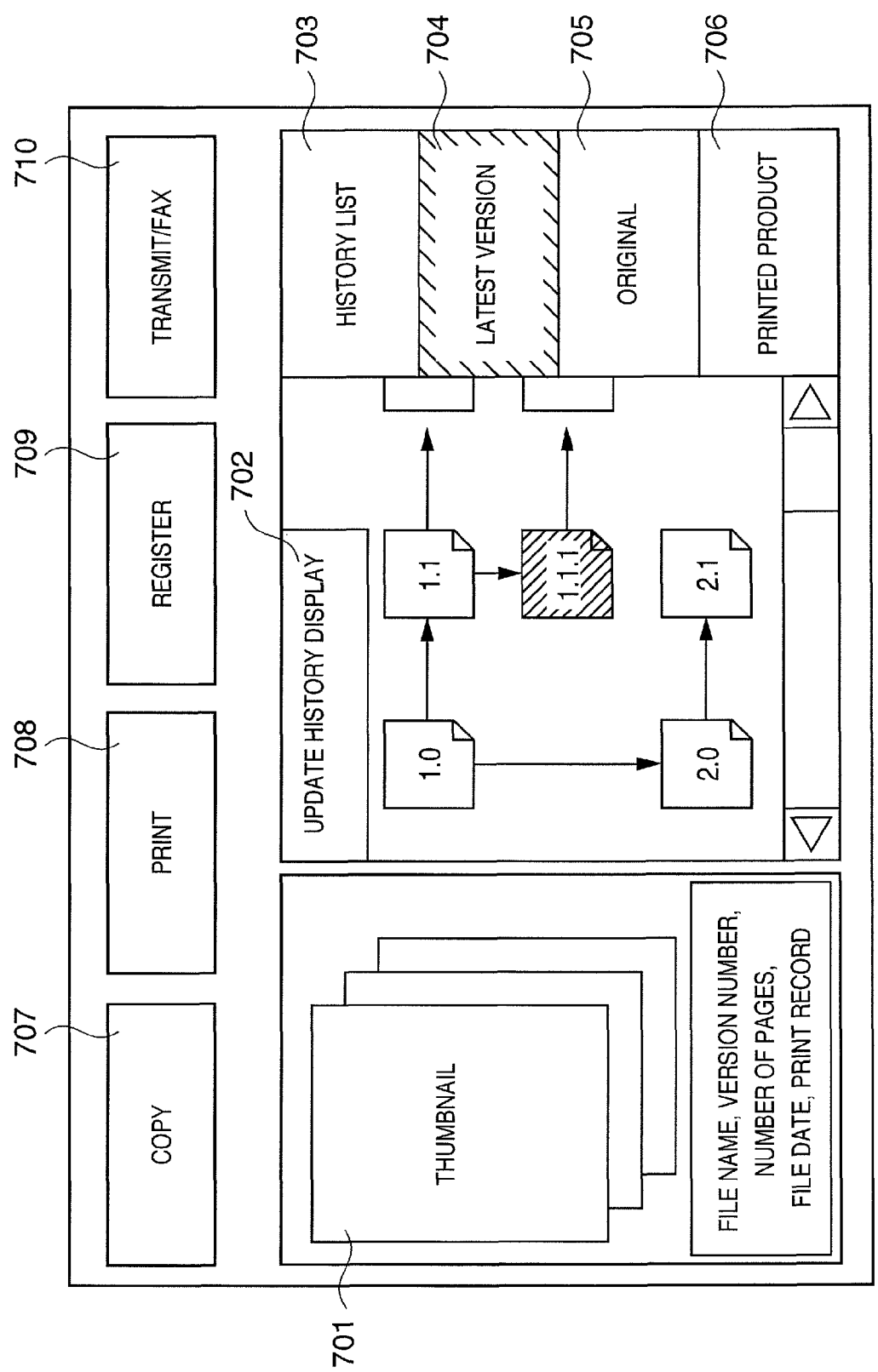
FIG. 7 is a view showing a display example of a window that is displayed on the display screen of a display unit 1405 of the client terminal apparatus 110 when it has successfully accessed the image forming apparatus 130.

If the authentication proves successful, the image forming apparatus 130 transmits the data of the window shown in FIG. 7 to the client terminal apparatus 110. In step S803, the client terminal apparatus 110 receives the data and displays a window based on the received data, i.e., the window shown in FIG. 7 on the display screen of the display unit 1405.

FIG. 7 is a view showing a display example of a window that is displayed on the display screen of the display unit 1405 of the client terminal apparatus 110 when it has successfully accessed the image forming apparatus 130.

An area 701 displays the thumbnail of the document file currently selected in a display area 702 (to be described later) or various kinds of information about the document file. The display area 702 displays the tree information received in step S408. When the user selects and designates one of icons displayed in the display area 702, the thumbnail of the corresponding document file is displayed in the area 701.

Areas 703 to 706 display items about each document file displayed in the display area 702. Referring to FIG. 7, a document file of version "1.1.1" is selected. In the display area 702, the icon of the document file of version "1.1.1" is highlighted. The "latest version" 704 is also highlighted. This indicates that the document file of version "1.1.1" is the "latest version".

A button image 707 is used to input an instruction to make the image forming apparatus 130 copy the document file currently selected in the display area 702. A button image 708 is used to input an instruction to make the image forming apparatus 130 print the document file currently selected in the display area 702. A button image 709 is used to input an instruction to register, in the image forming apparatus 130, the document file currently selected in the display area 702 as, e.g., a PDF file. A button image 710 is used to input an instruction to make the image forming apparatus 130 externally transmit (by, e.g., FAX transmission) the document file currently selected in the display area 702. When the button image 710 is designated, the image forming apparatus 130 further requests the operator to input/select the transmission method and transmission destination. The operator executes the settings.

Referring back to FIG. 8, in step S805, the client terminal apparatus 110 transmits the items set by using the GUI in FIG. 7 to the image forming apparatus 130. The transmission contents include information representing which process (specified by designating one of the button images 707 to 710) should be executed for a document file of which version (specified by the designated icon). More specifically, the transmission contents include the document ID of the document file indicated by the icon designated in the area 702 on the GUI in FIG. 7 and information representing a designated one of the button images 707 to 710.

Figure 9A:
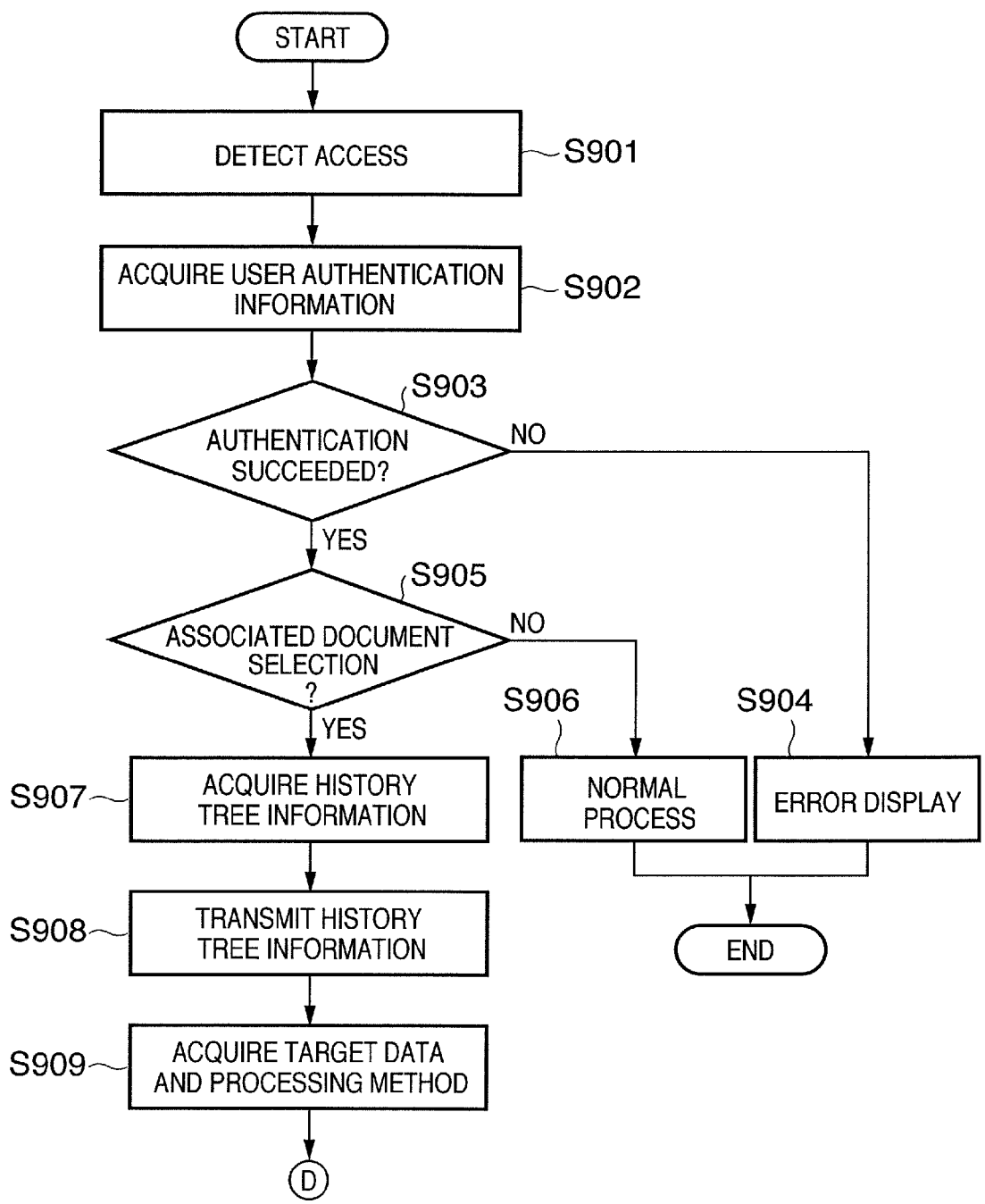
FIGS. 9A and 9B are flowchart of a process that is executed by the image forming apparatus 130 when the client terminal apparatus 110 has executed the process according to the flowchart in FIG. 8.
Figure 9B:
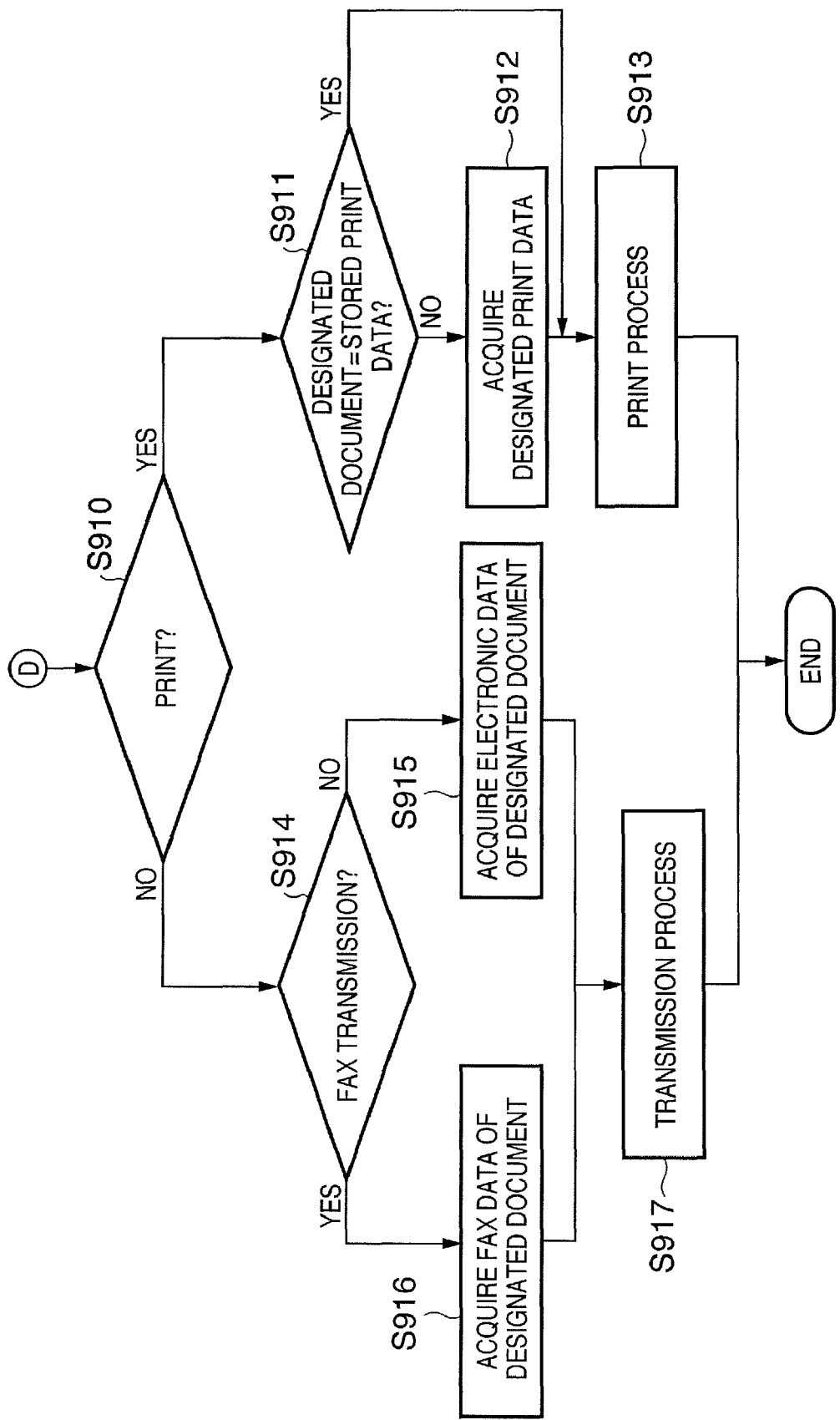

A process that is executed by the image forming apparatus 130 when the client terminal apparatus 110 has executed the process according to the flowchart in FIG. 8 will be described next with reference to FIGS. 9A and 9B showing the flowchart of the process. The ROM 1303 or external storage device 1306 saves programs and data to make the CPU 1301 execute the process according to the flowchart in FIGS. 9A and 9B. The programs and data are loaded into the RAM 1302, as needed, under the control of the CPU 1301. When the CPU 1301 executes the process by using the loaded programs and data, the image forming apparatus 130 executes the process to be described below.

In step S901, the image forming apparatus 130 detects the access from the client terminal apparatus 110 in step S801. In step S902, the image forming apparatus 130 requests authentication information. In step S903, an authentication process is executed by using the authentication information transmitted from the client terminal apparatus 110. If the authentication has failed, the process advances from step S903 to step S904 to reply an error to the client terminal apparatus 110.

If the authentication proves successful, the process advances from step S903 to step S905. In step S905, the image forming apparatus 130 determines whether the associated document selection mode is set. If the associated document selection mode is not set, the process advances to step S906 to execute a process in a mode corresponding to the above-described button image 204, 205, 207, or 208. If the associated document selection mode is set, the process advances to step S907 to refer to the associated document management table held in the external storage device 1306 and acquire tree information corresponding to the user name and password transmitted from the client terminal apparatus 110 upon authentication. In step S908, the image forming apparatus 130 transmits the acquired tree information to the client terminal apparatus 110.

In step S909, the image forming apparatus 130 specifies the process target document file and the process to be executed for the document file by referring to the contents transmitted in step S804. In step S910, if the process type indicates printing, i.e., if the button image 708 is designated on the GUI shown in FIG. 7, the process advances from step S910 to step S911. If the process type does not indicate printing, the process advances from step S910 to step S914.

In step S911, the image forming apparatus 130 refers to the associated document management table stored in the external storage device 1306 in step S408. The image forming apparatus 130 checks whether the document ID corresponding to the authentication information authenticated in the table in step S902 matches the document ID (the document ID of the document file designated on the GUI in FIG. 7 as the process target) described in the contents transmitted in step S804. If the document IDs match, the process advances to step S913. In step S913, print data corresponding to the authentication information authenticated in the table in step S902 is read out and sent to the printer unit 135. The printer unit 135 starts a print operation based on the print data. If the document IDs do not match, the process advances to step S912 to acquire, from the document management server 120, a document file corresponding to document ID (the document ID of the document file designated on the GUI in FIG. 7 as the process target) described in the contents transmitted in step S804. The process of acquiring the document file from the document management server 120 is the same as that described above. The print data of the acquired document file is generated and sent to the printer unit 135 in step S913. The printer unit 135 starts a print operation based on the print data.

On the other hand, in step S914, the image forming apparatus 130 checks whether the process type indicates FAX transmission. If it is determined by this check that the process type indicates FAX transmission, the process advances to step S916. Otherwise, the process advances to step S915. In step S916, the image forming apparatus 130 acquires, from the document management server 120, a document file corresponding to document ID (the document ID of the document file designated on the GUI in FIG. 7 as the process target) described in the contents transmitted in step S804 and generates FAX data. In step S917, the FAX data is sent to the FAX unit 136. The FAX unit 136 transmits the FAX data to the transmission destination contained in the print data. On the other hand, in step S915, the image forming apparatus 130 acquires, from the document management server 120, a document file corresponding to document ID (the document ID of the document file designated on the GUI in FIG. 7 as the process target) described in the contents transmitted in step S804 and generates electronic data. In step S917, the electronic data is transmitted (by, e.g., e-mail or SMB) to the designated transmission destination via the I/F 1307.

A document file has been exemplified in this embodiment. However, the present invention is not limited to this, and for example, an image file is also usable.

In this embodiment, the user designates printing or transmission of the latest or earliest version on the side of the client terminal apparatus 110. Not only the latest version and earliest version but also any other versions may be designated.

In this embodiment, when the user instructs the image forming apparatus 130 to print or transmit a document file of the latest or earliest version, the image forming apparatus 130 acquires both of the document IDs of the latest and earliest versions from the document management server 120. Instead, the image forming apparatus 130 may acquire only the document ID of a version requested as a print or transmission target from the document management server 120.

In this embodiment, the image forming apparatus 130 refers to the associated document management table stored in the external storage device 1306 in the associated document selection mode. Instead, the image forming apparatus 130 may acquire information from the document management server 120 in each process. More specifically, in step S907 of FIG. 9A, the image forming apparatus 130 may access the document management server 120, acquire, from the document management server 120, associated document information on which the latest document file holding situation is reflected, and generate history tree information based on it.

According to this embodiment, a document ID is transmitted to the image forming apparatus 130 so that the image forming apparatus 130 acquires a file from the document management server 120 and outputs the file, as described above. That is, the client terminal apparatus side need not hold an entire document to be output. It is possible to input a print or transmission output request of the entire document by using at least part of the document containing the document ID.

Second Embodiment

In the second embodiment, an image forming apparatus like an image forming apparatus 130 is provided in place of the client terminal apparatus 110. This image forming apparatus requests file of desired version and executes a desired process for the requested file, like the client terminal apparatus 110.

Figure 10:
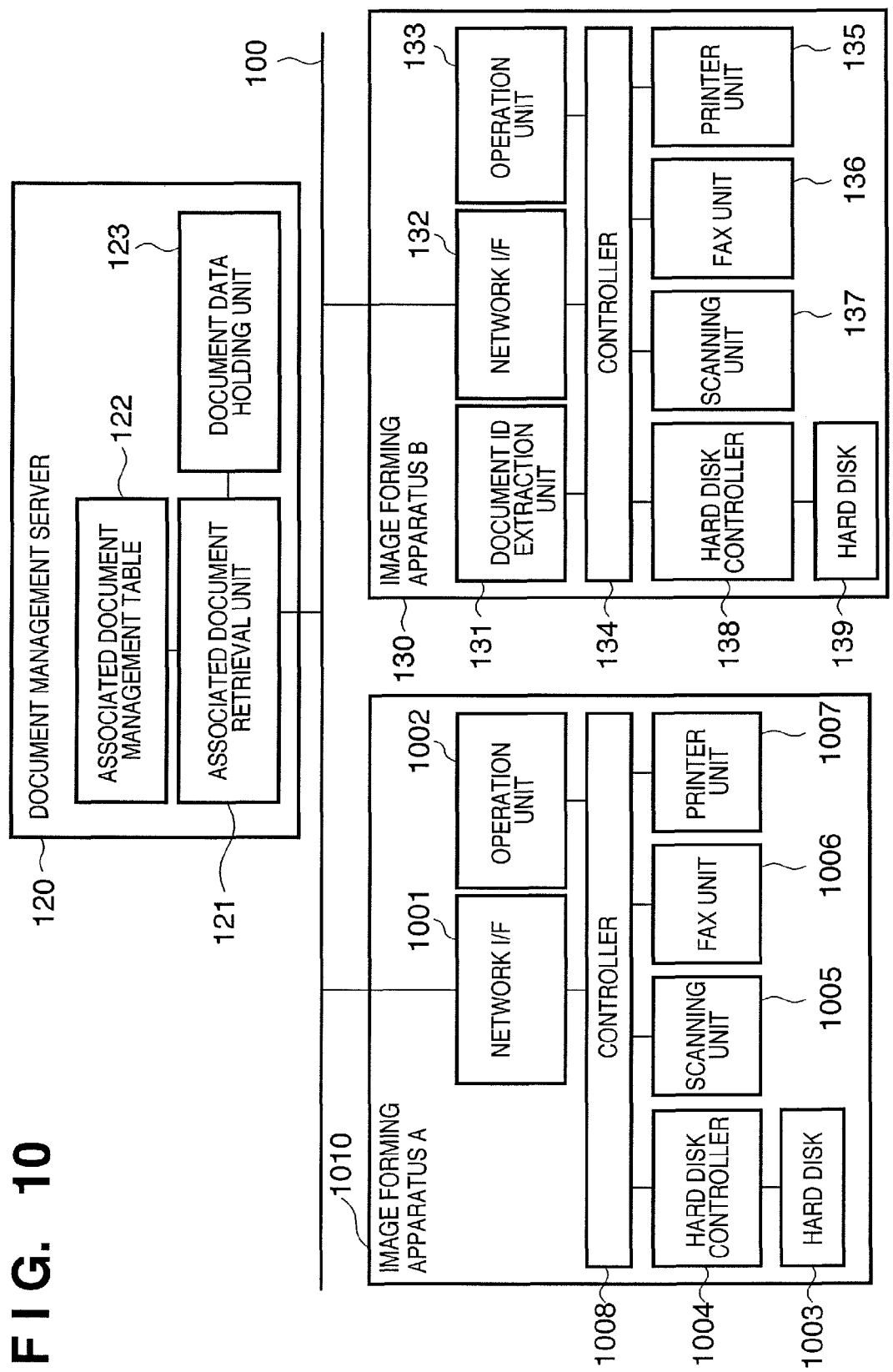
FIG. 10 is a block diagram showing a configuration example of a system according to the second embodiment of the present invention.

FIG. 10 is a block diagram showing a configuration example of a system according to this embodiment. As shown in FIG. 10, the system according to this embodiment uses an image forming apparatus 1010 in place of the client terminal apparatus 110 of the system shown in FIG. 1. The arrangement of the image forming apparatus 1010 is obtained by removing the document ID extraction unit 131 from the image forming apparatus 130. The hardware configuration of the image forming apparatus 1010 is the same as that of the image forming apparatus 130. In other words, the image forming apparatus 1010 comprises network I/F 1001, operation unit 1002, hard disk 1003, hard disk controller 1004, scanning unit 1005, FAX unit 1006, printer unit 1007, and controller 1008. However, a modified configuration may be used as needed. A description of the same parts as in the first embodiment will be omitted. Only the difference between the first and second embodiments will be described below.

Figure 11:
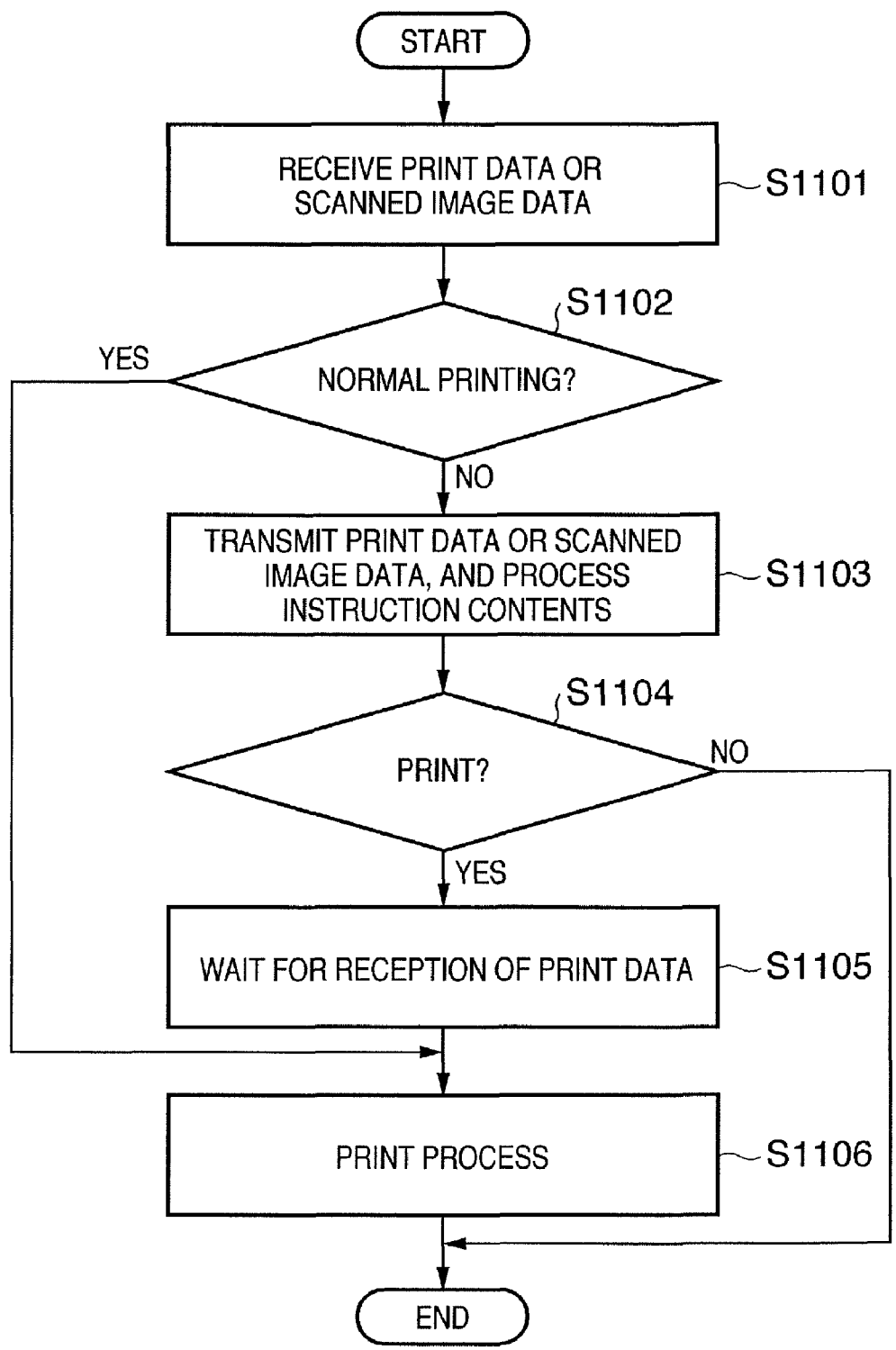
FIG. 11 is a flowchart of a process that is executed by an image forming apparatus 1010.

FIG. 11 is a flowchart of a process that is executed by the image forming apparatus 1010. In step S1101, the image forming apparatus 1010 receives image data input from a scanning unit 1005 or print data transmitted from another device connected to a LAN 100.

If the user inputs a normal print instruction, the process advances from step S1102 to step S1106. In step S1106, the print data received in step S1101 is sent to a printer unit 1007 to start a print process. Alternatively, print data is generated based on the image data received in step S1101 and sent to the printer unit 1007 to start a print process.

On the other hand, if the latest version print mode, original print mode, latest version transmission mode, or original transmission mode is set, as described in the first embodiment, the process advances from step S1102 to step S1103. In step S1103, the image forming apparatus 1010 transmits, to the image forming apparatus 130, information representing which process should be executed for data of which version, together with the data received in step S1101. The method of setting the process and the data version as the process target on the side of the image forming apparatus 1010 can be the same as in the first embodiment.

In step S1104, the image forming apparatus 1010 checks whether to execute a print process. If the result is NO in step S1104, the process is ended. If the result is YES in step S1104, the process advances to step S1105. In step S1105, the image forming apparatus 1010 waits for reception of the print data requested of the image forming apparatus 130. More specifically, the operator sets the "version of the file as the process target" by using the GUI as shown in FIG. 2 on the side of the image forming apparatus 1010 and requests the document file of the set version. Hence, the image forming apparatus 1010 waits for the document file of the requested version. Upon receiving the requested document file from the image forming apparatus 130, the image forming apparatus 1010 generates print data based on the document file. If the received data is print data, the generation process is not executed, as a matter of course. The process advances to step S1106 to send the print data to the printer unit 1007, thereby starting a print process.

Figure 12A:
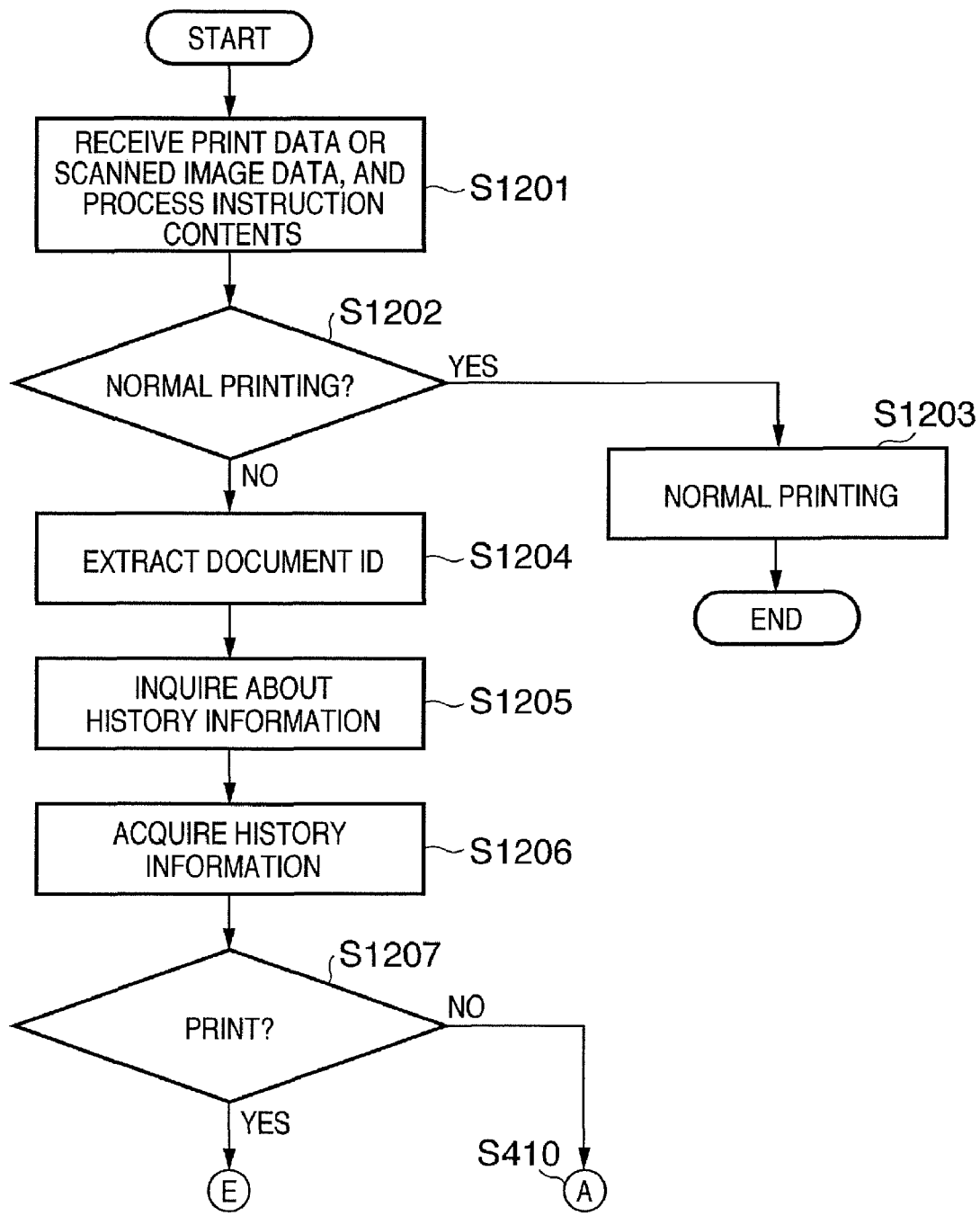
FIGS. 12A and 12B are flowchart of a process that is executed by an image forming apparatus 130 when the image forming apparatus 1010 has executed the process according to the flowchart in FIG. 11.
Figure 12B:
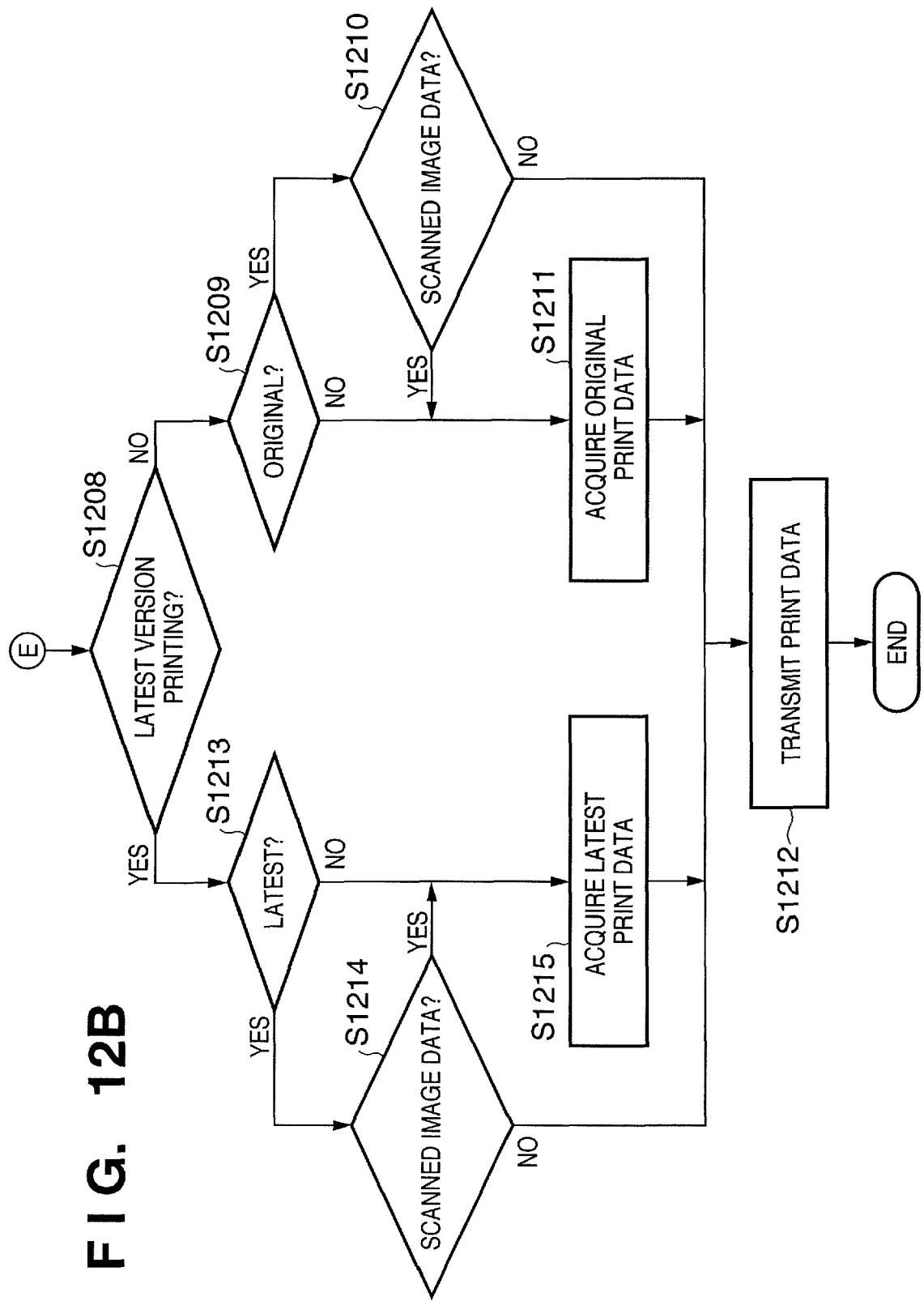

FIGS. 12A and 12B are flowchart of a process that is executed by the image forming apparatus 130 when the image forming apparatus 1010 has executed the process according to the flowchart in FIG. 11.

In step S1201, the image forming apparatus 130 temporarily saves the print data or image data transmitted from the image forming apparatus 1010 and various kinds of additional information in a RAM 1302 or external storage device 1306. In step S1202, the image forming apparatus 130 confirms the print mode by referring to the received additional information, as in the first embodiment. If a normal print mode is set, the process advances from step S1202 to step S1203. In step S1203, the received print data is sent to a printer unit 135 to start a print process. Alternatively, print data is generated based on the image data received in step S1201 and sent to the printer unit 135 to start a print process.

If the normal print mode is not set, the process advances from step S1202 to step S1204. In step S1204, the image forming apparatus 130 extracts a document ID contained in the print data or image data. In step S1205, the image forming apparatus 130 accesses a document management server 120 and requests it to acquire the document ID of the document file of the latest version and the document ID of the document file of the earliest version from document IDs in the history information containing the extracted document ID. In this way, the image forming apparatus 130 can acquire the document ID of the latest version and that of the earliest version from the document management server 120.

In step S1206, the image forming apparatus 130 receives the requested document IDs (the document ID of the latest version and that of the earliest version) transmitted from the document management server 120 and saves them in a RAM 1302.

In step S1207, the image forming apparatus 130 checks whether the mode is a print mode. In this embodiment, the print mode includes the latest version print mode and the original print mode. If it is determined by this check process that the latest version print mode or original print mode is set, the process advances from step S1207 to step S1208. If the mode is not the print mode, i.e., if the latest version transmission mode or original transmission mode is set, the process advances from step S1208 to step S410.

The above-described processes in steps S1204 to S1207 and S410 are executed in the same way as in steps S403 to S405, S409, and S410 of FIGS. 4A and 4B.

In step S1208, the image forming apparatus 130 checks which print mode is set, the latest version print mode or original print mode. If it is determined by this check process that the latest version print mode is set, the process advances from step S1208 to step S1213. If the original print mode is set, the process advances from step S1208 to step S1209.

In step S1213, the document ID of the latest version received in step S1206 is compared with the document ID extracted in step S1204. If the document IDs match upon comparison, the process advances to step S1214. Otherwise, the process advances to step S1215.

In step S1214, the image forming apparatus 130 checks whether the data received in step S1201 is image data or print data. If it is determined by this check that the data is print data, the process advances to step S1212 to transmit the print data received in step S1201 to the image forming apparatus 1010. On the other hand, if it is determined by the check in step S1214 that the data is image data, the process advances to step S1215.

In step S1215, the image forming apparatus 130 transmits the document ID of latest version to the document management server 120 and requests it to acquire the document file of the latest version. The document management server 120 transmits, to the image forming apparatus 130, the document file corresponding to the document ID of the latest version, i.e., the document file of the latest version. In step S1215, the image forming apparatus 130 receives the document file. In step S1212, print data is generated based on the received document file and transmitted to the image forming apparatus 1010.

On the other hand, in step S1209, the document ID of the earliest version received in step S1206 is compared with the document ID extracted in step S1204. If the document IDs match upon comparison, the process advances to step S1210. Otherwise, the process advances to step S1211.

In step S1210, the image forming apparatus 130 checks whether the data received in step S1201 is image data or print data. If it is determined by this check that the data is print data, the process advances to step S1212 to transmit the print data received in step S1201 to the image forming apparatus 1010. On the other hand, if it is determined by the check in step S1210 that the data is image data, the process advances to step S1211.

In step 31211, the image forming apparatus 130 transmits the document ID of the earliest version to the document management server 120 and requests it to acquire the document file of the earliest version. The document management server 120 transmits, to the image forming apparatus 130, the document file corresponding to the document ID of the earliest version, i.e., the document file of the earliest version. In step S1211, the image forming apparatus 130 receives the document file. In step S1212, print data is generated based on the received document file and transmitted to the image forming apparatus 1010.

Other Embodiment

The object of the present invention is also achieved by the following method. A recording medium (or storage medium) which records software program codes to implement the functions of the above-described embodiments is supplied to a system or apparatus. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

The operating system (OS) running on the computer partially or wholly executes actual processing based on the instructions of the program codes read out by the computer. This processing also implements the functions of the above-described embodiments.

The program codes read out from the recording medium are written in the memory of a function expansion card inserted into the computer or a function expansion unit connected to the computer. The CPU of the function expansion card or function expansion unit partially or wholly executes actual processing based on the instructions of the program codes. This processing also implements the functions of the above-described embodiments.

When the present invention is applied to the recording medium, the recording medium stores program codes corresponding to the above-described flowcharts.

As described above, the arrangement of the present invention makes it possible to process an arbitrary version of a file acquired from an apparatus that holds a file group based on electronic data received from an external device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of
Japanese Patent Application No. 2006-081489, filed Mar. 23, 2006, which is hereby incorporated by reference herein in its entirety.

What is claimed is:

1. An image forming apparatus which executes data communication between a client terminal apparatus and a document management server that holds, as file update history information, files of updated versions and identification data to identify the files of updated versions, comprising:
   a reception unit configured to receive together, from the client terminal apparatus that enables a user to selectively set a plurality of print modes including a normal print mode, a latest version print mode, and an original version print mode, print data generated at the client terminal apparatus based on a file set at the client terminal apparatus as a candidate to be printed by the image forming apparatus, wherein the print data includes the file set at the client terminal apparatus, identification data of the file, and mode information indicating a print mode that has been set at the client terminal apparatus;
   a first determination unit configured to determine, based on the mode information included in the received print data, which print mode is set at the client terminal apparatus;
   an acquisition unit configured to acquire, from the document management server, identification data of the file of the latest version;
   a second determination unit configured to determine whether or not the identification data acquired by said acquisition unit matches the identification data included in the received print data; and
   a print control unit configured to automatically execute a print process by using the print data received from the client terminal apparatus by said reception unit without acquiring a file from the document management server if it is determined by the first determination unit that the latest version print mode or the original version print mode is set and it is determined by the second determination unit that the identification data acquired by said acquisition unit matches the identification data included in the received print data, and to acquire a file corresponding to the identification data acquired by said acquisition unit from the document management server and automatically execute a print process by using print data based on the acquired file if it is determined by the first determination unit that the latest version print mode or the original version print mode is set and it is determined by the second determination unit that the identification data acquired by said acquisition unit does not match the identification data included in the received print data;
   wherein, if it is determined by the first determination unit that a normal print mode is set, the acquisition unit is configured to not perform the acquisition of the identification data of the file of the latest version, the second determination unit is configured to not perform the determination of whether or not the identification data acquired by said acquisition unit matches the identification data included in the received print data, and the print control unit is configured to automatically execute a print process by using the print data received from the client terminal apparatus by said reception unit; and
   wherein if it is determined by the second determination unit that the identification data acquired by said acquisition unit does not match the identification data included in the received print data in the original version print mode, the print control unit is configured to determine that the file set at the client terminal apparatus is not the earliest and original version of the file set at the client terminal apparatus, but that the file acquired by said acquisition unit from the document management server is the earliest and original version of the file set at the client terminal apparatus.

2. The apparatus according to claim 1, further comprising:
   a second reception unit configured to receive, from the client terminal apparatus, version information set at the client terminal apparatus as a version of a file to be externally transmitted by the image forming apparatus;
   a second acquisition unit configured to acquire, from the document management server, the file of the version indicated by the version information received by said second reception unit; and
   a transmission unit configured to externally transmit the file acquired by said second acquisition unit to an external device different from said client terminal apparatus.

3. The apparatus according to claim 2, wherein
   said second reception unit is configured to further receive transmission destination information indicating a transmission destination and transmission form information indicating a transmission form, and
   said transmission unit is configured to generate a file corresponding to the transmission form indicated by the transmission form information based on the file acquired by said second acquisition unit and is configured to transmit the generated file to the transmission destination indicated by the transmission destination information.

4. The apparatus according to claim 1, further comprising a transmission unit configured to transmit, to the client terminal apparatus, associated file information about files of other versions related to the file based on the identification data included in the received print data.

5. An image forming method performed by an image forming apparatus which executes data communication between a client terminal apparatus and a document management server that holds, as file update history information, files of updated versions and identification data to identify the files of updated versions, comprising:
   a reception step of receiving together, from the client terminal apparatus that enables a user to selectively set a plurality of print modes including a normal print mode, a latest version print mode, and an original version print mode, print data generated at the client terminal apparatus based on a file set at the client terminal apparatus as a candidate to be printed in the image forming apparatus, wherein the print data includes the file set at the client terminal apparatus, identification data of the file, and mode information indicating a print mode that has been set at the client terminal apparatus;
   a first determination step of determining, based on the mode information included in the received print data, which print mode is set at the client terminal apparatus;
   an acquisition step of acquiring, from the document management server, identification data of the file of the latest version;
   a second determination step of determining whether or not the identification data acquired in said acquisition step matches the identification data included in the received print data; and
   a print control step of automatically executing a print process by using the print data received from the client terminal apparatus in the reception step without acquiring a file from the document management server if it is determined in the first determination step that the latest version print mode or the original version print mode is set and it is determined in the second determination step that the identification data acquired in the acquisition step matches the identification data included in the received print data, and acquiring a file corresponding to the identification data acquired in the acquisition step from the document management server and automatically executing a print process by using print data based on the acquired file if it is determined in the first determination step that the latest version print mode or the original version print mode is set and it is determined in the second determination step that the identification data acquired in said acquisition step does not match the identification data included in the received print data;

wherein, if it is determined in the first determination step that a normal print mode is set, acquisition in the acquisition step and determination in the second determination step are not performed, and in the print control step a print process is automatically executed by using the print data received from the client terminal apparatus in said reception step; and wherein if it is determined in the second determination step that the identification data acquired in said acquisition step does not match the identification data included in the received print data in the original version print mode, the print control step determines that the file set at the client terminal apparatus is not the earliest and original version of the file set at the client terminal apparatus, but that the file acquired in said acquisition step from the document management server is the earliest and original version of the file set at the client terminal apparatus.

6. A non-transitory computer-readable storage medium storing a program configured to cause a computer to execute an image forming method performed by an image forming apparatus which executes data communication between a client terminal apparatus and a document management server that holds, as file update history information, files of updated versions and identification data to identify the files of updated versions, the program comprising:

instructions for receiving together, from the client terminal apparatus that enables a user to selectively set a plurality of print modes including a normal print mode, a latest version print mode, and an original version print mode, print data generated at the client terminal apparatus based on a file set at the client terminal apparatus as a candidate to be printed in the image forming apparatus, wherein the print data includes the file set at the client terminal apparatus, identification data of the file, and mode information indicating a print mode that has been set at the client terminal apparatus;

first instructions for determining, based on the mode information included in the received print data, which print mode is set at the client terminal apparatus;

instructions for acquiring, from the document management server, identification data of the file of the latest version;

second instructions for determining whether or not the identification data acquired in said acquisition step matches the identification data included in the received print data; and print control instructions for automatically executing a print process by using the print data received from the client terminal apparatus according to the instructions for receiving without acquiring a file from the document management server if it is determined according to the first instructions for determining that the latest version print mode or the original version print mode is set and it is determined according to the second instructions for determining that the identification data acquired according to the instructions for acquiring matches the identification data included in the received print data, and acquiring a file corresponding to the identification data acquired according to the instructions for acquiring from the document management server and automatically executing a print process by using print data based on the acquired file if it is determined according to the first instructions for determining that the latest version print mode or the original version print mode is set and it is determined according to the second instructions for determining that the identification data acquired according to the instructions for acquiring does not match the identification data included in the received print data;

wherein, if it is determined according to the first instructions for determining that a normal print mode is set, acquisition according to the instructions for acquiring and determination according to the second instructions for determining are not performed, and according to the print control instructions, a print process is automatically executed by using the print data received from the client terminal apparatus according to the instructions for receiving; and wherein if it is determined according to the second instructions for determining that the identification data acquired according to the instructions for acquiring does not match the identification data included in the received print data in the original version print mode, it is determined according to the print control instructions that the file set at the client terminal apparatus is not the earliest and original version of the file set at the client terminal apparatus, but that the file acquired from the document management server according to the instructions for acquiring is the earliest and original version of the file set at the client terminal apparatus.

* * * * *